US012577448B2

(12) United States Patent
Matsumoto

(10) Patent No.: US 12,577,448 B2
(45) Date of Patent: *Mar. 17, 2026

(54) REFRIGERATOR OIL COMPOSITION AND MIXED COMPOSITION FOR REFRIGERATOR

(71) Applicant: IDEMITSU KOSAN CO., LTD., Tokyo (JP)

(72) Inventor: Tomoya Matsumoto, Funabashi (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/726,444

(22) PCT Filed: Feb. 15, 2023

(86) PCT No.: PCT/JP2023/005182

§ 371 (c)(1),
(2) Date: Jul. 3, 2024

(87) PCT Pub. No.: WO2023/157867

PCT Pub. Date: Aug. 24, 2023

(65) Prior Publication Data

US 2025/0084295 A1 Mar. 13, 2025

(30) Foreign Application Priority Data

Feb. 15, 2022 (JP) ................................ 2022-021581

(51) Int. Cl.
*C09K 5/04* (2006.01)

(52) U.S. Cl.
CPC ........ *C09K 5/045* (2013.01); *C09K 2205/114* (2013.01); *C09K 2205/126* (2013.01)

(58) Field of Classification Search
CPC .... C09K 5/04; C09K 5/045; C09K 2205/114; C09K 2205/126; C10N 2020/02; C10N 2020/04; C10N 2020/101; C10N 2030/10; C10N 2030/08; C10N 2040/30; C10N 2030/20; C10N 2030/04; C10M 171/008; C10M 2223/041; C10M 2207/042; C10M 2203/04; C10M 2229/046; C10M 2229/047; C10M 2207/026; C10M 2209/043; C10M 2229/041
See application file for complete search history.

(56) References Cited

U.S. PATENT DOCUMENTS

| | | | | |
|---|---|---|---|---|
| 4,248,726 A * | 2/1981 | Uchinuma | C10M 107/34 508/304 |
| 2004/0119047 A1 | 6/2004 | Singh et al. | |
| 2012/0228541 A1 | 9/2012 | Takigawa et al. | |
| 2013/0012420 A1 | 1/2013 | Matsumoto | |
| 2016/0040094 A1 | 2/2016 | Kaneko et al. | |
| 2017/0327759 A1 | 11/2017 | Takahashi et al. | |
| 2017/0335230 A1 | 11/2017 | Matsumoto | |
| 2019/0292476 A1* | 9/2019 | Nakajima | C09K 5/04 |
| 2024/0093120 A1 | 3/2024 | Nakajima | |

FOREIGN PATENT DOCUMENTS

| | | | | |
|---|---|---|---|---|
| EP | 4 317 377 A1 | 2/2024 | |
| JP | S63289098 A * | 11/1988 | |
| JP | 2-140298 A | 5/1990 | |
| JP | 11-152488 A | 6/1999 | |
| JP | 2006-503961 A | 2/2006 | |
| JP | 2011-46885 A | 3/2011 | |
| JP | 5399821 B2 | 1/2014 | |
| JP | 2014-177607 A | 9/2014 | |
| JP | 2016-98280 A | 5/2016 | |
| JP | 2017-89982 A | 5/2017 | |
| JP | 2020158786 A * | 10/2020 | C10M 155/02 |
| WO | WO 2016/002523 A1 | 1/2016 | |
| WO | WO 2016/056392 A1 | 4/2016 | |
| WO | WO 2022/196689 A1 | 9/2022 | |
| WO | WO 2022/209688 A1 | 10/2022 | |

OTHER PUBLICATIONS

International Search Report and Written Opinion issued May 9, 2023, in PCT/JP2023/005182 (with English Translation), 13 pages.
Official Communication issued on Jan. 20, 2026, in European Application No. 23756392.9, 6 pages.

* cited by examiner

*Primary Examiner* — Ishal V Vasisth
(74) *Attorney, Agent, or Firm* — Oblon, McClelland, Maier & Neustadt, L.L.P.

(57) ABSTRACT

A refrigerator oil composition used in a refrigerant containing one or more unsaturated fluorinated hydrocarbon compounds selected from compounds represented by the following general formula (1): $C_xF_yH_z$ (1), wherein x is an integer of 2 to 6, y is an integer of 1 to 11, z is an integer of 1 to 11, and there are one or more carbon-carbon unsaturated bonds in the molecule, the refrigerator oil composition containing a base oil (A) that includes polyvinyl ether, a modified silicone compound (B), and a specific epoxy compound (C).

11 Claims, No Drawings

REFRIGERATOR OIL COMPOSITION AND MIXED COMPOSITION FOR REFRIGERATOR

CROSS-REFERENCE TO RELATED APPLICATIONS

This application is a National Phase entry of Japanese PCT Application PCT/JP2023/005182, filed on Feb. 15, 2023, which claims priority to Japanese Patent Application No. JP2022-021581, filed on Feb. 15, 2022. The entire contents of each of these applications are incorporated herein by reference.

TECHNICAL FIELD

The present invention relates to a refrigerator oil composition and a mixed composition for a refrigerator.

In the description herein, the “mixed composition for a refrigerator” refers to a composition obtained by mixing a “refrigerator oil composition” and a “refrigerant”.

BACKGROUND ART

A refrigerator such as a compression-type refrigerator generally includes at least a compressor, a condenser, an expansion mechanism (for example, an expansion valve), and an evaporator, and has a structure in which a mixed composition for a refrigerator circulates in a sealed system.

As a refrigerant used for a refrigerator such as a compression-type refrigerator, fluorinated hydrocarbon compounds having a low environmental load are being used instead of a hydrochlorofluorocarbon (HCFC) which has been conventionally used in many cases. As the fluorinated hydrocarbon compound, saturated fluorinated hydrocarbon compounds (Hydro-Fluoro-Carbon; hereinafter, also referred to as “HFC”) such as 1,1,1,2-tetrafluoroethane (R134a), difluoromethane (R32), and 1,1-difluoroethane (R152a) are being used.

In addition, the use of unsaturated fluorinated hydrocarbon compounds (Hydro-Fluoro-Olefin; hereinafter, also referred to as “HFO”) having a low global warming potential (GWP), such as 1,3,3,3-tetrafluoropropene (R1234ze), 2,3,3,3-tetrafluoropropene (R1234yf), and 1,2,3,3-tetrafluoropropene (R1234ye), has also been considered (see, for example, PTL 1).

CITATION LIST

Patent Literature

PTL1: JP 2006-503961 A

SUMMARY OF INVENTION

Technical Problem

However, while having an advantage of low global warming potential (GWP), the unsaturated fluorinated hydrocarbon compounds (HFOs) have a disadvantage of lower thermal stability at high temperatures when compared to the saturated fluorinated hydrocarbon compounds (HFCs). Therefore, when the content of the unsaturated fluorinated hydrocarbon compounds (HFOs) in the refrigerant increases, there is a problem that the acid value of the refrigerator oil composition tends to increase.

In addition, in recent years, refrigerators have become more compact and have higher performance, and operating conditions thereof have become more severe than ever. Therefore, the refrigerator oil compositions are required to have higher quality than ever before. For example, as refrigerators become more compact, the amount of refrigerator oil composition used inside the equipment is decreasing; however, due to harsher operating conditions, frictional heat in sliding parts of the compressor causes localized high temperatures to easily occur in some areas. When the mixed composition for a refrigerator is exposed to such an area, the acid value of the refrigerator oil composition is more likely to increase.

Therefore, it is desired to create a refrigerator oil composition that can effectively suppress an increase in the acid value even when the content of the unsaturated fluorinated hydrocarbon compounds (HFOs) in the refrigerant is increased.

The present invention has been made in view of such demands, and an object thereof is to provide a refrigerator oil composition that can effectively suppress an increase in the acid value even when the content of the unsaturated fluorinated hydrocarbon compounds (HFOs) in the refrigerant is increased, and a mixed composition for a refrigerator containing the refrigerator oil composition.

Solution to Problem

The inventors of the present invention have conducted intensive studies to solve the above problems. As a result, the present inventors have found that a refrigerator oil composition in which a modified silicone compound (B) and an epoxy compound (C) meeting specific requirements are combined and the content of the modified silicone compound (B) is adjusted to a specific range can solve the above problems, and have completed the present invention.

Specifically, the present invention relates to the following [1] to [3].

[1]A refrigerator oil composition used in a refrigerant containing one or more unsaturated fluorinated hydrocarbon compounds selected from compounds represented by the following general formula (1):

$$C_xF_yH_z \quad (1)$$

wherein x is an integer of 2 to 6, y is an integer of 1 to 11, z is an integer of 1 to 11, and there are one or more carbon-carbon unsaturated bonds in a molecule, the refrigerator oil composition containing a base oil (A) that includes polyvinyl ether, a modified silicone compound (B), and an epoxy compound (C) that satisfies the following requirements (α) and (β):

requirement (α): having at least one divalent group represented by the following formula (2) in the molecule, (2)

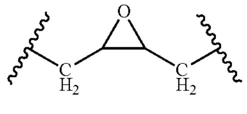

requirement (β): having at least one ester group in the molecule.

[2]A mixed composition for a refrigerator, containing the refrigerator oil composition according to the above [1], and a refrigerant containing one or more unsaturated fluorinated hydrocarbon compounds selected from compounds represented by the following general formula (1):

$$C_xF_yH_z \quad (1)$$

wherein x is an integer of 2 to 6, y is an integer of 1 to 11, z is an integer of 1 to 11, and there are one or more carbon-carbon unsaturated bonds in a molecule.

[3]A method for producing a refrigerator oil composition used in a refrigerant containing one or more unsaturated fluorinated hydrocarbon compounds selected from compounds represented by the following general formula (1):

$$C_xF_yH_z \quad (1)$$

wherein x is an integer of 2 to 6, y is an integer of 1 to 11, z is an integer of 1 to 11, and there are one or more carbon-carbon unsaturated bonds in a molecule, the method for producing a refrigerator oil composition including a step of mixing a base oil (A) that includes polyvinyl ether, a modified silicone compound (B), and an epoxy compound (C) that satisfies the following requirements (α) and (β):

requirement (α): having at least one divalent group represented by the following formula (2) in the molecule, (2)

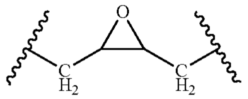

requirement (β): having at least one ester group in the molecule.

Advantageous Effects of Invention

According to the present invention, it is possible to provide a refrigerator oil composition that can effectively suppress an increase in the acid value even when the content of the unsaturated fluorinated hydrocarbon compounds (HFOs) in the refrigerant is increased, and a mixed composition for a refrigerator containing the refrigerator oil composition.

DESCRIPTION OF EMBODIMENTS

Upper limit values and lower limit values of numerical ranges described in the present description can be arbitrarily combined. For example, when "A to B" and "C to D" are described as numerical ranges, the numerical ranges of "A to D" and "C to B" are also included in the scope of the present invention.

In addition, the numerical range "lower limit value to upper limit value" described in the present description means the lower limit value or more, and the upper limit value or less, unless otherwise specified.

Also in the present description, a numerical value in Examples is a numerical value usable as an upper limit value or a lower limit value.

[Embodiment of Refrigerator Oil Composition]

The refrigerator oil composition of the present embodiment is a refrigerator oil composition used in a refrigerant containing one or more unsaturated fluorinated hydrocarbon compounds selected from compounds represented by the following general formula (1):

$$C_xF_yH_z \quad (1)$$

wherein x is an integer of 2 to 6, y is an integer of 1 to 11, z is an integer of 1 to 11, and there are one or more carbon-carbon unsaturated bonds in a molecule.

The refrigerator oil composition of the present embodiment contains a base oil (A) that includes polyvinyl ether, a modified silicone compound (B), and an epoxy compound (C) that satisfies the following requirements (α) and (3).

Requirement (α): having at least one divalent group represented by the following formula (2) in the molecule.

(2)

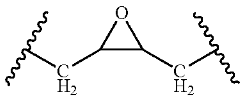

Requirement (β): having at least one ester group in the molecule.

The inventors of the present invention have conducted various studies based on the idea that one of the reasons why the acid value of the refrigerator oil composition tends to increase when the content of the unsaturated fluorinated hydrocarbon compounds (HFOs) in the refrigerant increases is the fluorine content generated by decomposition of the unsaturated fluorinated hydrocarbon compounds (HFOs) in a high temperature environment.

As a result, the present inventors have found that the refrigerator oil composition having the above structure can suppress an increase in the acid value of the refrigerator oil composition by suppressing an increase in the fluorine concentration in the refrigerator oil composition due to the fluorine content generated by the decomposition of the unsaturated fluorinated hydrocarbon compounds (HFOs) in a high temperature environment.

Although details of the mechanism by which the effects of the present invention are exhibited is not clearly understood, it is presumed to be as follows, for example.

That is, it is presumed that since the refrigerator oil composition of the present embodiment has the above structure, an increase in the acid value of the refrigerator oil composition is suppressed by at least one of the following effects (i) and (ii).

(i) An effect of inhibiting decomposition of unsaturated fluorinated hydrocarbon compounds (HFOs) in a high temperature environment.

(ii) An effect of capturing fluorine ($F^-$) eluted into the refrigerator oil composition due to the decomposition of unsaturated fluorinated hydrocarbon compounds (HFOs) in a high temperature environment and reducing the amount of fluorine ($F^-$) in the refrigerator oil composition.

In the following explanation, the "base oil (A)", the "modified silicone compound (B)", and the "epoxy compound (C)" will also be referred to as "component (A)", "component (B)", and "component (C)", respectively.

The refrigerator oil composition of the present embodiment may be composed of only the component (A), the component (B), and the component (C); however, within a range that does not depart from the spirit of the present invention, additional components other than the component (A), the component (B), and the component (C) may be contained.

In the refrigerator oil composition of the present embodiment, the total content of the component (A), the component (B), and the component (C) is preferably 80% by mass or more, more preferably 85% by mass or more, and still more preferably 90% by mass or more, based on the total amount of the refrigerator oil composition.

Hereinafter, each component contained in the refrigerator oil composition of the present embodiment will be described in detail.

<Base Oil (A)>

The refrigerator oil composition of the present embodiment contains a base oil (A).

In the refrigerator oil composition of the present embodiment, from the viewpoint of long-term stability required for the refrigerator oil composition, the content of the base oil (A) is preferably 85.0% by mass or more, more preferably 90.0% by mass or more, and still more preferably 92.0% by mass or more, based on the total amount of the refrigerator oil composition. In addition, from the viewpoint of making it easier to ensure the content of the component (B) and the component (C) in the refrigerator oil composition, and furthermore, from the viewpoint of making it easier to ensure the content of additives other than the component (B) and the component (C), it is preferably 99.0% by mass or less, more preferably 98.5% by mass or less, and still more preferably 98.0% by mass or less.

The upper limit values and the lower limit values of these numerical ranges can be arbitrarily combined. Specifically, it is preferably 85.0% by mass to 99.0% by mass, more preferably 90.0% by mass to 98.5% by mass, and still more preferably 92.0% by mass to 98.0% by mass.

The refrigerator oil composition of the present embodiment contains a polyvinyl ether (hereinafter also referred to as "PVE") as the base oil (A).

Hereinafter, PVE will be explained in detail.

(Polyvinyl Ethers (PVE))

PVE is a polymer having one or more types of constitutional units derived from vinyl ether, and PVE used as a base oil in a refrigerator oil composition can be used without particular restriction.

PVE may be used alone or may be used in combination of two or more thereof.

From the viewpoint of compatibility with the refrigerant, PVE is preferably a polymer having one or more types of constitutional units derived from vinyl ether and having an alkyl group having 1 to 4 carbon atoms in a side chain.

PVE is preferably a polymer (A-2) having one or more types of constitutional units represented by the following general formula (A-2).

(A-2)

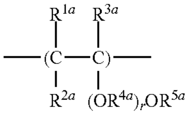

In the formula (A-2), $R^{1a}$, $R^{2a}$, and $R^{3a}$ each independently represent a hydrogen atom or a hydrocarbon group having 1 to 8 carbon atoms. $R^{4a}$ represents a divalent hydrocarbon group having 2 to 10 carbon atoms. $R^{5a}$ represents a hydrocarbon group having 1 to 10 carbon atoms. r is the number of repeating units of $OR^{4a}$, and is usually 0 to 10, preferably 0 to 5, more preferably 0 to 3, and even more preferably 0. When a plurality of $OR^{4a}$'s exists in the constitutional unit represented by the above general formula (A-2), the plurality of $OR^{4a}$'s may be the same as or different from each other.

Examples of the hydrocarbon groups having 1 to 8 carbon atoms represented by $R^{1a}$, $R^{2a}$, and $R^{3a}$ include alkyl groups such as methyl groups, ethyl groups, n-propyl groups, isopropyl groups, various butyl groups, various pentyl groups, various hexyl groups, various heptyl groups, and various octyl groups; cycloalkyl groups such as cyclopentyl groups, cyclohexyl groups, various methylcyclohexyl groups, various ethylcyclohexyl groups, and various dimethylcyclohexyl groups; aryl groups such as phenyl groups, various methylphenyl groups, various ethylphenyl groups, and various dimethylphenyl groups; and arylalkyl groups such as benzyl groups, various phenylethyl groups, and various methylbenzyl groups.

Here, "various" refers to "linear, branched, or cyclic" hydrocarbon groups, and for example, "various butyl groups" refers to various butyl groups such as "n-butyl groups, sec-butyl groups, isobutyl groups, tert-butyl groups, and cyclobutyl groups". In addition, a group having a cyclic structure includes a positional isomer, such as ortho, meta, and para forms, and the same applies hereinafter.

The number of carbon atoms in the hydrocarbon groups represented by $R^{1a}$, $R^{2a}$, and $R^{3a}$ is preferably 1 to 6, and more preferably 1 to 3.

$R^{1a}$, $R^{2a}$, and $R^{3a}$ are each independently preferably a hydrogen atom or an alkyl group having 1 to 8 carbon atoms, more preferably a hydrogen atom or an alkyl group having 1 to 3 carbon atoms, and still more preferably a hydrogen atom.

Examples of the divalent hydrocarbon group having 2 to 10 carbon atoms represented by $R^{4a}$ include divalent aliphatic groups such as ethylene groups, 1,2-propylene groups, 1,3-propylene groups, various butylene groups, various pentylene groups, various hexylene groups, various heptylene groups, various octylene groups, various nonylene groups, and various decylene groups; divalent alicyclic groups such as cyclohexane, methylcyclohexane, ethylcyclohexane, dimethylcyclohexane, and propylcyclohexane; divalent aromatic groups such as various phenylene groups, various methylphenylene groups, various ethylphenylene groups, various dimethylphenylene groups, and various naphthylene groups; a divalent alkyl aromatic group having a monovalent bonding site in each of an alkyl group portion and an aromatic portion of an alkyl aromatic hydrocarbon such as toluene, xylene, and ethylbenzene; and a divalent alkyl aromatic group having a bonding site in an alkyl group portion of a polyalkyl aromatic hydrocarbon such as xylene and diethylbenzene.

The number of carbon atoms in the hydrocarbon group represented by $R^{4a}$ is preferably 2 to 6, and more preferably 2 to 4.

$R^{4a}$ is preferably a divalent aliphatic group having 2 to 10 carbon atoms, and more preferably a divalent aliphatic group having 2 to 4 carbon atoms.

Examples of the hydrocarbon group having 1 to 10 carbon atoms represented by $R^{5a}$ include alkyl groups such as methyl groups, ethyl groups, n-propyl groups, isopropyl groups, various butyl groups, various pentyl groups, various hexyl groups, various heptyl groups, various octyl groups, various nonyl groups, and various decyl groups; cycloalkyl groups such as cyclopentyl groups, cyclohexyl groups, various methylcyclohexyl groups, various ethylcyclohexyl groups, various propylcyclohexyl groups, and various dimethylcyclohexyl groups; aryl groups such as phenyl groups, various methylphenyl groups, various ethylphenyl groups, various dimethylphenyl groups, various propylphenyl groups, various trimethylphenyl groups, various butylphenyl groups, and various naphthyl groups; and arylalkyl groups such as benzyl groups, various phenylethyl groups, various methylbenzyl groups, various phenylpropyl groups, and various phenylbutyl groups.

The number of carbon atoms in the hydrocarbon group represented by $R^{5a}$ is preferably 1 to 8, and more preferably 1 to 6.

From the viewpoint of further improving compatibility with the refrigerant, $R^{5a}$ is preferably an alkyl group having 1 to 6 carbon atoms, and more preferably an alkyl group having 1 to 4 carbon atoms.

The number of constitutional units (degree of polymerization) represented by the above general formula (A-2) is appropriately selected depending on the kinematic viscosity required of the base oil (A).

Further, the polymer having the constitutional unit represented by the above general formula (A-2) may be a homopolymer having only one type of the constitutional unit, or a copolymer having two or more types of the constitutional unit. When the polymer is a copolymer, the form of copolymerization is not particularly limited and may be any of block copolymers, random copolymers, and graft copolymers.

Here, the polymer (A-2) preferably has a constitutional unit (a2) in which $R^{5a}$ is an ethyl group. From the viewpoint of further improving the refrigerant solubility, the content of the constitutional unit (a2) is preferably 70 mol % or more and 100 mol % or less, more preferably 80 mol % or more and 100 mol % or less, and even more preferably 90 mol % or more and 100 mol % or less, based on the total amount (100 mol %) of constitutional units other than terminal constitutional units possessed by the polymer (A-2).

A monovalent group derived from a saturated hydrocarbon, ether, alcohol, ketone, amide, or nitrile may be introduced into a terminal portion of the polymer (A-2). Among these, it is preferable that the one terminal portion of the polymer (A-2) is a group represented by the following general formula (A-2-i).

(A-2-i)

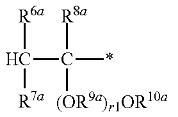

In the formula (A-2-i), * indicates a bonding position with a carbon atom in the constitutional unit represented by the above general formula (A-2).

In the formula (A-2-i), $R^{6a}$, $R^{7a}$, and $R^{8a}$ each independently represent a hydrogen atom or a hydrocarbon group having 1 to 8 carbon atoms, preferably a hydrogen atom or a hydrocarbon group having 1 to 6 carbon atoms, and more preferably a hydrogen atom or an alkyl group having 1 to 3 carbon atoms.

Examples of the hydrocarbon group having 1 to 8 carbon atoms represented by $R^{6a}$, $R^{7a}$, and $R^{8a}$ include the same ones exemplified as the hydrocarbon group having 1 to 8 carbon atoms represented by $R^{1a}$, $R^{2a}$, and $R^{3a}$ in the above general formula (A-2).

In the above formula (A-2-i), $R^{9a}$ represents a divalent hydrocarbon group having 2 to 10 carbon atoms, preferably a divalent hydrocarbon group having 2 to 6 carbon atoms, and more preferably a divalent aliphatic group having 2 to 4 carbon atoms.

In the above formula (A-2-i), r1 is the number of repeating units of $OR^{9a}$, and is usually 0 to 10, preferably 0 to 5, more preferably 0 to 3, and even more preferably 0. When a plurality of $OR^{9a}$'s exists in the constitutional unit represented by the above general formula (A-2-i), the plurality of $OR^{9a}$'s may be the same as or different from each other.

Examples of the divalent hydrocarbon group having 2 to 10 carbon atoms represented by $R^{9a}$ include the same ones exemplified as the divalent hydrocarbon group having 2 to 10 carbon atoms represented by $R^{4a}$ in the above general formula (A-2).

In the formula (A-2-i), $R^{10a}$ represents a hydrocarbon group having 1 to 10 carbon atoms, preferably a hydrocarbon group having 1 to 8 carbon atoms, and more preferably an alkyl group having 1 to 8 carbon atoms.

$R^{10a}$ is preferably an alkyl group having 1 to 6 carbon atoms when r1 in the above general formula (A-2-i) is 0, and is preferably an alkyl group having 1 to 4 carbon atoms when r1 is 1 or more.

Examples of the hydrocarbon group having 1 to 10 carbon atoms represented by $R^{10a}$ include the same ones exemplified as the hydrocarbon group having 1 to 10 carbon atoms represented by $R^{5a}$ in the above general formula (A-2).

Further, regarding the polymer (A-2), when one terminal portion is a group represented by the above general formula (A-2-i), the other terminal portion is preferably any of a group represented by the above general formula (A-2-i), a group represented by the following general formula (A-2-ii), a group represented by the following general formula (A-2-iii), and a group having an olefinically unsaturated bond.

(A-2-ii)

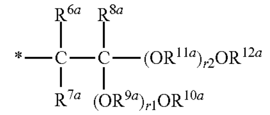

(A-2-iii)

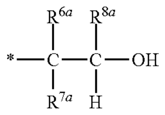

In the formulas (A-2-ii) and (A-2-iii), $R^{6a}$, $R^{7a}$, $R^{8a}$, $R^{9a}$, $R^{10a}$, and r1 are the same as defined in the general formula (A-2-i) above. In addition, in the formula (A-2-ii), $R^{1a}$, $R^{2a}$ and r2 are the same as defined for $R^{9a}$, $R^{10a}$, and r1 in the above general formula (A-2-i), respectively.

(Preferred Embodiment of Base Oil (A))

In the refrigerator oil composition of the present embodiment, from the viewpoint of easily improving the effects of the present invention, the content of PVE in the base oil (A) is, based on the total amount of the base oil (A), preferably 50% by mass to 100% by mass, more preferably 60% by mass to 100% by mass, even more preferably 70% by mass to 100% by mass, still more preferably 80% by mass to 100% by mass, further more preferably 90% by mass to 100% by mass, and significantly preferably 100% by mass.

(Other Base Oil)

The base oil (A) may further contain other base oils within a range that does not impair the effects of the present invention.

Examples of other base oils include one or more types selected from the group consisting of mineral oil and synthetic oil that does not correspond to the PVE.

Examples of the mineral oil include atmospheric pressure residual oils obtained by atmospheric distillation of crude oils such as paraffinic crude oils, intermediate base crude oils, and naphthenic crude oils; distillate oils obtained by vacuum distillation of these atmospheric residual oils; and mineral oils obtained by subjecting the distillate oils to one or more refining treatments such as solvent de-asphalting, solvent extraction, hydrocracking, solvent dewaxing, catalytic dewaxing, and hydro-refining.

When a mineral oil is contained in the base oil (A), the mineral oil may be used alone or may be used in combination of two or more thereof.

Examples of the synthetic oil not corresponding to the PVE include polyalkylene glycols, copolymers of poly(oxy) alkylene glycol or its monoether and polyvinyl ether, polyol esters, polyesters, polycarbonates, hydrides of α-olefin oligomers, alicyclic hydrocarbon compounds, alkylated aromatic hydrocarbon compounds, and oils produced by isomerizing GTL WAX (gas-to-liquid wax) produced by the Fischer-Tropsch process.

When a synthetic oil not corresponding to the PVE is contained in the base oil (A), the synthetic oil may be used alone or may be used in combination of two or more thereof.

In the refrigerator oil composition of the present embodiment, the content of mineral oil is preferably small from the viewpoint of solubility of the component (B) and the component (C). Specifically, the content of the mineral oil is, based on the total amount of the base oil (A), preferably 10% by mass or less, more preferably 5% by mass or less, still more preferably 1% by mass or less, even more preferably 0.1% by mass or less, and even still more preferably free of mineral oil.

In addition, in the refrigerator oil composition of the present embodiment, it is preferable that the content of synthetic oil that does not correspond to PVE is small, from the viewpoint of easily improving the effects of the present invention. Specifically, the content of the synthetic oil not corresponding to PVE is, based on the total amount of the base oil (A), preferably 10% by mass or less, more preferably 5% by mass or less, still more preferably 1% by mass or less, even more preferably 0.1% by mass or less, and even still more preferably free of the synthetic oil not corresponding to PVE.

(Kinematic Viscosity at 100° C. of Base Oil (A))

The kinematic viscosity at 100° C. of the base oil (A) is preferably 3 $mm^2/s$ or more, more preferably 4 $mm^2/s$ or more, and still more preferably 5 $mm^2/s$ or more, from the viewpoint of improving lubrication performance (load-bearing performance) and sealing performance. On the other hand, from the viewpoint of improving compatibility with the refrigerant, it is preferably 50 $mm^2/s$ or less, more preferably 40 $mm^2/s$ or less, and still more preferably 30 $mm^2/s$ or less.

The upper limit values and the lower limit values of these numerical ranges can be arbitrarily combined. Specifically, it is preferably 3 $mm^2/s$ to 50 $mm^2/s$, more preferably 4 $mm^2/s$ to 40 $mm^2/s$, and still more preferably 5 $mm^2/s$ to 30 $mm^2/s$.

In the present description, the kinematic viscosity at 100° C. of the base oil (A) is a value measured according to JIS K2283:2000.

(Hydroxyl Value of Base Oil (A))

The hydroxyl value of the base oil (A) is, from the viewpoint of improving the thermal stability of the refrigerator oil composition, preferably 30 mgKOH/g or less, more preferably 25 mgKOH/g or less, even more preferably 20 mgKOH/g or less, still more preferably 15 mgKOH/g or less, further more preferably 10 mgKOH/g or less, and still further more preferably 5 mgKOH/g or less. In addition, the hydroxyl value of the base oil (A) is usually 0.1 mgKOH/g or more.

In the present description, the hydroxyl value of the base oil (A) is a value measured by a neutralization titration method according to JIS K0070:1992.

(Number Average Molecular Weight (Mn) of Base Oil (A))

The number average molecular weight (Mn) of the base oil (A) is preferably 300 or more, more preferably 400 or more, and still more preferably 500 or more, from the viewpoint of improving lubrication performance (load-bearing performance) and sealing performance. On the other hand, from the viewpoint of improving compatibility with the refrigerant, it is preferably 10,000 or less, more preferably 7,000 or less, and still more preferably 5,000 or less.

The upper limit values and the lower limit values of these numerical ranges can be arbitrarily combined. Specifically, it is preferably 300 to 10,000, more preferably 400 to 7,000, and even more preferably 500 to 5,000.

In the present description, the number average molecular weight (Mn) of the base oil (A) is a value measured by a method described in the Examples to be described later.

<Modified Silicone Compound (B)>

The refrigerator oil composition of the present embodiment contains a modified silicone compound (B).

When used in combination with the epoxy compound (C), the modified silicone compound (B) can effectively suppress the elution of fluorine content into the refrigerator oil composition due to the decomposition of the unsaturated fluorinated hydrocarbon compounds (HFOs), and can effectively suppress an increase in the acid value of the refrigerator oil composition.

When the refrigerator oil composition does not contain the modified silicone compound (B), an increase in the acid value of the refrigerator oil composition cannot be sufficiently suppressed.

In the refrigerator oil composition of the present embodiment, from the viewpoint of further improving the effects of the present invention, the content of the modified silicone compound (B) is preferably 0.05% by mass or more, more preferably 0.08% by mass or more, still more preferably 0.10% by mass or more, even more preferably 0.30% by mass or more, further preferably 0.60% by mass or more, and still further preferably 0.90% by mass or more, based on the total amount of the refrigerator oil composition. The upper limit value of the content of the modified silicone compound (B) is not particularly limited; however, from the viewpoint of obtaining an effect commensurate with the amount added, it is preferably 5.0% by mass or less, more preferably 4.0% by mass or less, and still more preferably 3.0% by mass or less.

The upper limit values and the lower limit values of these numerical ranges can be arbitrarily combined. Specifically, the content of the modified silicone compound (B) is preferably 0.05% by mass to 5.0% by mass, more preferably 0.08% by mass to 4.0% by mass, even more preferably 0.10% by mass to 3.0% by mass, still more preferably 0.30% by mass to 3.0% by mass, furthermore preferably 0.60% by mass to 3.0% by mass, and yet more preferably 0.90% by mass to 3.0% by mass.

The modified silicone compound (B) can be used without any particular restriction as long as it is a silicone compound in which at least one portion of side chains and ends of a polysiloxane skeleton in an unmodified silicone compound has been modified.

An unmodified silicone compound is a silicone compound in which the side chains and ends of the polysiloxane skeleton are all composed of alkyl groups, and no functional groups other than the alkyl groups have been introduced into the side chains and ends of the polysiloxane skeleton. Preferable examples of the unmodified silicone compound include compounds represented by the following general formula (b1-1).

(b-1-1)

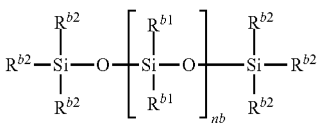

In the above general formula (b1-1), $R^{b1}$ and $R^{b2}$ are each independently an alkyl group having 1 to 10 carbon atoms. nb is an integer of 1 or more. The carbon number of the alkyl group that can be selected as $R^{b1}$ and $R^{b2}$ is preferably 1 to 6, more preferably 1 to 3, even more preferably 1 to 2, and still more preferably 1.

In the following description, $R^{b1}$ will be referred to as the alkyl group on a side chain of the polysiloxane skeleton, and $R^{b2}$ will be referred to as the alkyl group at an end of the polysiloxane skeleton.

Here, the above expression "at least one portion of side chains and ends of a polysiloxane skeleton in an unmodified silicone compound has been modified" means that at least one of an alkyl group of a side chain ($R^{b1}$ in the following general formula (b1-1)) and an alkyl group of an end ($R^{b2}$ in the above general formula (b1-1)) of the polysiloxane skeleton in the unmodified silicone compound is substituted with a functional group other than the alkyl group.

Examples of side chain modified type of modified silicones include monoamine modified silicones, diamine modified silicones, special amino modified silicones, epoxy modified silicones, alicyclic epoxy modified silicones, carbinol modified silicones, mercapto modified silicones, carboxy modified silicones, hydrogen modified silicones, amino/polyether modified silicones, epoxy/polyether modified silicones, epoxy/aralkyl modified silicones, polyether modified silicones, aralkyl modified silicones, fluoroalkyl modified silicones, long-chain alkyl modified silicones, higher fatty acid ester modified silicones, higher fatty acid amide modified silicones, polyether/long-chain alkyl/aralkyl modified silicones, long-chain alkyl/aralkyl modified silicones, and phenyl modified silicones.

These may be used alone or may be used in combination of two or more thereof.

Examples of terminal modified type of modified silicones include two-ends modified silicones, such as amino modified silicones, epoxy modified silicones, alicyclic epoxy modified silicones, carbinol modified silicones, methacrylic modified silicones, polyether modified silicones, mercapto modified silicones, carboxy modified silicones, phenol modified silicones, silanol modified silicones, acrylic modified silicones, and carboxylic anhydride modified silicones; and one-end modified silicones, such as epoxy modified silicones, carbinol modified silicones, diol modified silicones, methacrylic modified silicones, and carboxy modified silicones.

Examples of side chain terminal modified type of modified silicones include side chain amino modified/two-ends methoxy modified silicones, and side chain epoxy modified/two-ends epoxy modified silicones.

Here, in the present embodiment, from the viewpoint of further improving the effects of the present invention, the modified silicone compound (B) preferably includes a side chain modified silicone (B1) in which at least a side chain of the polysiloxane skeleton is modified.

From the viewpoint of further easily improving the effects of the present invention, the content of the side chain modified silicone (B1) in the modified silicone compound (B) is, based on the total amount of the modified silicone compound (B), preferably 50% by mass to 100% by mass, more preferably 60% by mass to 100% by mass, even more preferably 70% by mass to 100% by mass, still more preferably 80% by mass to 100% by mass, further more preferably 90% by mass to 100% by mass, and significantly preferably 95% by mass to 100% by mass.

In addition, from the viewpoint of further easily improving the effects of the present invention, the side chain modified silicone (B1) preferably includes one or more selected from a side chain modified silicone (B1a) having one or more epoxy groups in the side chain and a side chain modified silicone (B1b) having one or more polyether groups in the side chain.

Examples of the side chain modified silicone (B1a) having one or more epoxy groups in the side chain include side chain modified type epoxy modified silicones, side chain modified type alicyclic epoxy modified silicones, side chain modified type epoxy/polyether modified silicones, side chain modified type epoxy/aralkyl modified silicones; and side chain end modified type side chain epoxy modified/two-ends epoxy modified silicones.

A commercially available product may be used as the side chain modified silicone (B1a) having one or more epoxy groups in the side chain.

Examples of the commercially available side chain modified type epoxy modified silicones include X-22-343, KF-101, KF-1001, and X-22-2000 manufactured by Shin-Etsu Chemical Co., Ltd.; SF8411 Fluid and SF8413 Fluid manufactured by Dow Toray Co., Ltd.

Examples of the commercially available side chain modified type alicyclic epoxy modified silicones include X-22-2046 and KF-102 manufactured by Shin-Etsu Chemical Co., Ltd.; BY16-839 Fluid and L-9300 manufactured by Dow Toray Co., Ltd.

Examples of the commercially available side chain modified type epoxy/polyether modified silicones include X-22-4741 and KF-1002 manufactured by Shin-Etsu Chemical Co., Ltd.; BY16-876 and FZ-3736 Fluid manufactured by Dow Toray Co., Ltd.

Examples of the commercially available side chain modified type epoxy/aralkyl modified silicones include KF-1005 manufactured by Shin-Etsu Chemical Co., Ltd.

Examples of the commercially available side chain terminal modified type side chain epoxy modified/two-ends epoxy modified silicones include X-22-9002 manufactured by Shin-Etsu Chemical Co., Ltd.

Among these, from the viewpoint of availability and effects, it is preferable that the side chain modified silicone (Bia) having one or more epoxy groups in the side chain is one or more selected from the group consisting of side chain modified type epoxy modified silicones and side chain modified type alicyclic epoxy modified silicones.

The side chain modified silicone (B1a) having one or more epoxy groups in the side chain may be used alone or may be used in combination of two or more thereof.

Examples of the side chain modified silicone (Bib) having one or more polyether groups in the side chain include side chain modified type polyether modified silicones, side chain modified type amino/polyether modified silicones, and side chain modified type polyether/long-chain alkyl/aralkyl modified silicones.

In the present description, a silicone compound having both an epoxy group and a polyether group in a side chain, such as a side chain modified type epoxy/polyether modified silicone, is classified as a side chain modified silicone (B1a) having one or more epoxy group in the side chain.

A commercially available product may be used as the side chain modified silicone (Bib) having one or more polyether groups in the side chain.

Examples of the commercially available side chain modified type polyether modified silicones include KF-351A, KF-352A, KF-353, KF-354L, KF-355A, KF-615A, KF-945, KF-640, KF-642, KF-643, KF-644, KF-6020, KF-6204, X-22-4515, KF-6011, KF-6012, KF-6015, and KF-6015 manufactured by Shin-Etsu Chemical Co., Ltd., and FZ-2110 manufactured by Dow Toray Co., Ltd.

Examples of the commercially available side chain modified type amino/polyether modified silicones include X-22-3939A manufactured by Shin-Etsu Chemical Co., Ltd.

Examples of the commercially available side chain modified type polyether/long-chain alkyl/aralkyl modified silicones include X-22-2516 manufactured by Shin-Etsu Chemical Co., Ltd.

Among these, from the viewpoint of availability and effects, the side chain modified silicone (B1b) having one or more polyether groups in the side chain is preferably a side chain modified type polyether modified silicone.

The side chain modified silicone (Bib) having one or more polyether groups in the side chain may be used alone or may be used in combination of two or more thereof.

The content of one or more types selected from the side chain modified silicone (Bla) having one or more epoxy groups in the side chain and the side chain modified silicone (Bib) having one or more polyether in the side chain in the side chain modified silicone (B1) is, based on the total amount of the side chain modified silicone (B1), preferably 50% by mass to 100% by mass, more preferably 60% by mass to 100% by mass, even more preferably 70% by mass to 100% by mass, still more preferably 80% by mass to 100% by mass, further more preferably 90% by mass to 100% by mass, and significantly preferably 95% by mass to 100% by mass.

<Epoxy Compound (C)>

The refrigerator oil composition of the present embodiment contains an epoxy compound (C) that satisfies the following requirements (α) and (β).

(α): having at least one divalent group represented by the following formula (2) in the molecule.

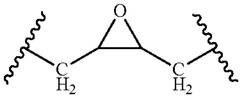

(2)

(β): having at least one ester group in the molecule.

When used in combination with the modified silicone compound (B), the epoxy compound (C) can effectively suppress the elution of fluorine content into the refrigerator oil composition due to the decomposition of the unsaturated fluorinated hydrocarbon compounds (HFOs), and can effectively suppress an increase in the acid value of the refrigerator oil composition.

When the refrigerator oil composition does not contain the epoxy compound (C), an increase in the acid value of the refrigerator oil composition cannot be sufficiently suppressed.

The epoxy compound (C) preferably has a molecular weight of 300 or more because the reactivity of the epoxy group can be moderately suppressed, the decomposition of the unsaturated fluorinated hydrocarbon compounds can be suppressed, and the solubility into base oil can be improved, more preferably has a molecular weight of 320 or more, and still more preferably has a molecular weight of 350 or more.

In addition, the molecular weight of the epoxy compound (C) is, from the viewpoint of solubility in refrigerator oil and sludge formation after stability evaluation, preferably 2,000 or less, more preferably 1,500 or less, and still more preferably 1,000 or less.

In the refrigerator oil composition of the present embodiment, the content of the epoxy compound (C) is, from the viewpoint of further easily improving the effects of the present invention, preferably 0.05% by mass or more, more preferably 0.07% by mass or more, and still more preferably 0.08% by mass or more, based on the total amount of the refrigerator oil composition. The upper limit value of the content of the epoxy compound (C) is not particularly limited; however, from the viewpoint of obtaining an effect commensurate with the amount added, it is preferably 5.0% by mass or less, more preferably 4.0% by mass or less, and still more preferably 3.0% by mass or less.

The upper limit values and the lower limit values of these numerical ranges can be arbitrarily combined. Specifically, it is preferably 0.05% by mass to 5.0% by mass, more preferably 0.07% by mass to 4.0% by mass, and still more preferably 0.08% by mass to 3.0% by mass.

In the present embodiment, as the epoxy compound (C), one or more types selected from the group consisting of those satisfying the above two requirements (α) and (β) can be used without any particular restriction.

Here, from the viewpoint of further easily improving the effects of the present invention, the epoxy compound (C) preferably contains one or more selected from the group consisting of an epoxidized fatty acid ester (C1), an epoxidized vegetable oil (C2), and an epoxidized alicyclic carboxylic acid ester (C3).

The content of one or more types selected from the group consisting of the epoxidized fatty acid ester (C1), the epoxidized vegetable oil (C2), and the epoxidized alicyclic carboxylic acid ester (C3) in the epoxy compound (C) is, based on the total amount of the epoxy compound (C), preferably 50% by mass to 100% by mass, more preferably 60% by mass to 100% by mass, even more preferably 70% by mass to 100% by mass, still more preferably 80% by mass to 100% by mass, further more preferably 90% by mass to 100% by mass, and significantly preferably 95% by mass to 100% by mass.

The epoxidized fatty acid ester (C1), the epoxidized vegetable oil (C2), and the epoxidized alicyclic carboxylic acid ester (C3) will be explained below.

(Epoxidized Fatty Acid Ester (C1))

Examples of the epoxidized fatty acid ester (C1) include those obtained by epoxidizing esters of a fatty acid having 8 to 30 carbon atoms (preferably 12 to 20 carbon atoms) and an alcohol having 1 to 10 carbon atoms, a phenol, or an alkylphenol having 7 to 14 carbon atoms.

As the epoxidized fatty acid ester (C1), those represented by the following general formula (c1) are preferably used from the viewpoint of effectively suppressing an increase in the acid value of the refrigerator oil composition.

(c1)

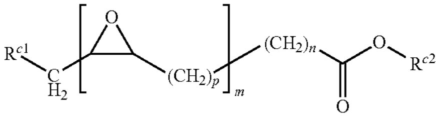

In the formula (c1), $R^{c1}$ is a hydrocarbon group having 4 to 20 carbon atoms, $R^{c2}$ is a hydrocarbon group having 1 to 10 carbon atoms, p is an integer of 1 to 3, n is an integer of 0 to 12, and m is an integer of 1 to 3. When m is 2 or more, a plurality of structures in brackets [ ] may be the same as or different from each other.

Examples of the above hydrocarbon groups include alkyl groups such as methyl groups, ethyl groups, n-propyl groups, isopropyl groups, various butyl groups, various pentyl groups, various hexyl groups, various heptyl groups, various octyl groups, various nonyl groups, and various decyl groups; cycloalkyl groups such as cyclopentyl groups, cyclohexyl groups, various methylcyclohexyl groups, various ethylcyclohexyl groups, various propylcyclohexyl groups, and various dimethylcyclohexyl groups; aryl groups such as phenyl groups, various methylphenyl groups, various ethylphenyl groups, various dimethylphenyl groups, various propylphenyl groups, various trimethylphenyl groups, various butylphenyl groups, and various naphthyl groups; and arylalkyl groups such as benzyl groups, various phenylethyl groups, various methylbenzyl groups, various phenylpropyl groups, and various phenylbutyl groups, each having the appropriate number of carbon atoms.

In the epoxidized fatty acid ester represented by (c1) above, it is preferable that $R^{c1}$ is an alkyl group having 5 to 12 carbon atoms, $R^{c2}$ is an alkyl group having 1 to 10 carbon atoms, p is 1, n is an integer of 1 to 10, and m is 1 or 2.

Specific examples of the epoxidized fatty acid ester (C1) include those obtained by epoxidizing butyl ester, hexyl ester, 2-ethylhexyl ester, benzyl ester, cyclohexyl ester, methoxyethyl ester, octyl ester, phenyl ester, or butylphenyl ester of linoleic acid, oleic acid, palmitic acid, linolenic acid, or stearic acid.

Examples of commercially available products of the epoxidized fatty acid ester (C1) include Sansocizer E-6000 manufactured by New Japan Chemical Co., Ltd. and Chemisizer T-5000 manufactured by Sanwa Gosei Kagaku Co., Ltd.

The epoxidized fatty acid ester (C1) may be used alone or may be used in combination of two or more thereof.

(Epoxidized Vegetable Oil (C2))

Examples of the epoxidized vegetable oil (C2) include those obtained by epoxidizing vegetable oils such as soybean oil, linseed oil, rice bran oil, and cottonseed oil.

As the epoxidized vegetable oil (C2), from the viewpoint of more easily improving the effects of the present invention, those having a group represented by the following general formula (c2) are preferably used, and more specifically, glycerin esters having one or more groups represented by the following general formula (c2) are preferred, triglycerides having one or more groups represented by the following general formula (c2) are more preferred, and triglycerides having two or more groups represented by the following general formula (c2) are even more preferred.

(c2)

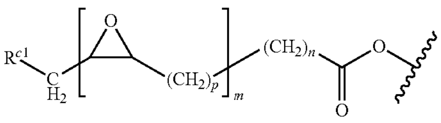

In the formula (c2), $R^{c1}$ is a hydrocarbon group having 4 to 20 carbon atoms, p is an integer of 1 to 3, n is an integer of 0 to 12, and m is an integer of 1 to 3. When m is 2 or more, a plurality of structures in brackets [ ] may be the same as or different from each other.

The details of the above $R^{c1}$ are the same as those in the above formula (c1).

In a group represented by (c2) above, it is preferable that $R^{c1}$ is an alkyl group having 4 to 12 carbon atoms, p is 1, n is an integer of 1 to 10, and m is 1 or 2.

Examples of commercially available products of the epoxidized vegetable oil (C2) include Sansocizer E-2000H manufactured by New Japan Chemical Co., Ltd., Chemisizer SE-80, Chemisizer SE-100, Chemisizer T-3000N, Chemisizer LE-3000, and Chemisizer T-2000 manufactured by Sanwa Gosei Kagaku Co., Ltd., Nusizer 51OR manufactured by NOF Corporation, and ADEKASIZER O-180A manufactured by ADEKA Corporation.

The epoxidized vegetable oil (C2) may be used alone or may be used in combination of two or more thereof.

(Epoxidized Alicyclic Carboxylic Acid Ester (C3))

Examples of the epoxidized alicyclic carboxylic acid ester (C3) include those obtained by epoxidizing esters of an alicyclic carboxylic acid having 5 to 12 ring carbon atoms and an alcohol having 1 to 8 carbon atoms, a phenol, or an alkylphenol having 7 to 14 carbon atoms, and the alicyclic carboxylic acid may be a monocarboxylic acid or a dicarboxylic acid.

As the epoxidized alicyclic carboxylic acid ester (C3), those represented by the following general formula (c3) are preferably used from the viewpoint of effectively suppressing an increase in the acid value of the refrigerator oil composition.

(c3)

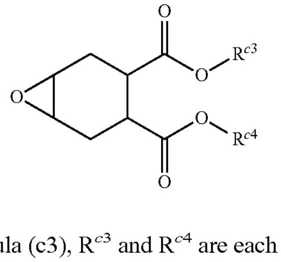

In the formula (c3), $R^{c3}$ and $R^{c4}$ are each independently a hydrocarbon group having 4 to 20 carbon atoms.

Specific examples of the above hydrocarbon group include those having the same number of carbon atoms as those listed as the hydrocarbon group in the formula (c1).

In the epoxidized alicyclic carboxylic acid esters represented by (c3) above, it is preferable that $R^{c3}$ and $R^{c4}$ are each independently an alkyl group having 6 to 12 carbon atoms.

Specific examples of the epoxidized alicyclic carboxylic acid esters include epoxidized alicyclic dicarboxylic acid esters, and more specifically, di-2-ethylhexyl 4,5-epoxycyclohexane-1,2-dicarboxylate.

Examples of commercially available products of the epoxidized alicyclic carboxylic acid esters include Sansocizer E-PS manufactured by New Japan Chemical Co., Ltd.

The epoxidized alicyclic carboxylic acid ester (C3) may be used alone or may be used in combination of two or more thereof.

Here, from the viewpoint of further easily improving the effects of the present invention, the epoxy compound (C) more preferably contains one or more selected from the group consisting of the epoxidized fatty acid ester (C1) and the epoxidized vegetable oil (C2), and even more preferably contains the epoxidized fatty acid ester (C1).

<Content Ratio of Modified Silicone Compound (B) and Epoxy Compound (C)>

In the refrigerator oil composition of the present embodiment, from the viewpoint of further improving the effects of the present invention, the content ratio of the modified silicone compound (B) and the epoxy compound (C) [(B)/(C)] is, in terms of mass ratio, preferably 0.10 or more, more preferably 0.15 or more, still more preferably 0.20 or more, even more preferably 0.50 or more, further preferably 1.0 or more, still further preferably 5.0 or more, and yet further preferably 8.0 or more. Further, it is preferably 20 or less, more preferably 18 or less, and still more preferably 16 or less.

The upper limit values and the lower limit values of these numerical ranges can be arbitrarily combined. Specifically, it is preferably 0.10 to 20, more preferably 0.15 to 18, still more preferably 0.20 to 16, even more preferably 0.50 to 16, further preferably 1.0 to 16, still further preferably 5.0 to 16, and yet further preferably 8.0 to 16.

<Antioxidant (D)>

The refrigerator oil composition of the present embodiment may further contain an antioxidant (D).

Preferred examples of the antioxidant (D) include one or more selected from the group consisting of phenol-based antioxidants and amine-based antioxidants.

Examples of phenol-based antioxidants include 2,6-di-tert-butyl-p-cresol (DBPC), 2,6-di-tert-butyl-4-ethylphenol, and 2,2'-methylenebis(4-methyl-6-tert-butylphenol).

Examples of the amine-based antioxidants include phenyl-α-naphthylamine, and N,N'-diphenyl-p-phenylenediamine.

Among these, the phenol-based antioxidants are preferred, and among the phenol-based antioxidants, 2,6-di-tert-butyl-p-cresol (DBPC) is preferred.

From the viewpoint of stability and antioxidant performance, the content of the antioxidant (D) is preferably 0.01% by mass or more, more preferably 0.05% by mass or more, and still more preferably 0.1% by mass or more, based on the total amount of the refrigerator oil composition. In addition, it is preferably 5% by mass or less, more preferably 3% by mass or less, and even more preferably 1% by mass or less.

The upper limit values and the lower limit values of these numerical ranges can be arbitrarily combined. Specifically, it is preferably 0.01% by mass to 5% by mass, more preferably 0.05% by mass to 3% by mass, and still more preferably 0.1% by mass to 1% by mass.

The antioxidant (D) may be used alone or may be used in combination of two or more thereof.

<Content Ratio of Modified Silicone Compound (B) and Antioxidant (D)>

When the refrigerator oil composition of the present embodiment contains the antioxidant (D), from the viewpoint of further easily improving the effects of the present invention, the content ratio of the modified silicone compound (B) and the antioxidant (D) [(B)/(D)] is, in terms of mass ratio, preferably 0.10 or more, more preferably 0.20 or more, and still more preferably 0.30 or more. Further, it is preferably 10.0 or less, more preferably 5.0 or less, and still more preferably 4.0 or less.

(Content Ratio of Epoxy Compound (C) and Antioxidant (D))

When the refrigerator oil composition of the present embodiment contains the antioxidant (D), from the viewpoint of further easily improving the effects of the present invention, the content ratio of the epoxy compound (C) and the antioxidant (D) [(C)/(D)] is, in terms of mass ratio, preferably 0.10 or more, more preferably 0.20 or more, and still more preferably 0.30 or more. Further, it is preferably 10.0 or less, more preferably 5.0 or less, still more preferably 4.0 or less, and even more preferably 2.0 or less.

<Glycidyl Ether Compound (E)>

The refrigerator oil composition of the present embodiment may further contain a glycidyl ether compound (E).

Examples of the glycidyl ether compound (E) include a glycidyl ether derived from an aliphatic monohydric or polyhydric alcohol having usually 3 to 30 carbon atoms, preferably 4 to 24 carbon atoms, and more preferably 6 to 16 carbon atoms, or a glycidyl ether derived from an aromatic compound containing one or more hydroxy groups. The aliphatic monohydric or polyhydric alcohol may be linear, branched or cyclic, and may be saturated or unsaturated; however, it is preferably a saturated aliphatic monoalcohol.

In the case of an aliphatic polyhydric alcohol or an aromatic compound containing two or more hydroxy groups, from the viewpoint of the stability of the refrigerator oil composition, it is preferable that all of the hydroxy groups are glycidyl etherified.

Examples of the glycidyl ether compound include phenyl glycidyl ether, alkyl glycidyl ether, and alkylene glycol glycidyl ether, and among these, in particular, glycidyl ethers derived from linear, branched, or cyclic saturated aliphatic monoalcohols having 6 to 16 carbon atoms (i.e., alkyl glycidyl ethers in which the alkyl group has 6 to 16 carbon atoms) are more preferred. Examples of such glycidyl ethers include 2-ethylhexyl glycidyl ether, isononyl glycidyl ether, decyl glycidyl ether, lauryl glycidyl ether, and myristyl glycidyl ether, and 2-ethylhexyl glycidyl ether is most preferred. By using an alkyl glycidyl ether such as 2-ethylhexyl glycidyl ether, an increase in the acid value of the refrigerator oil composition can be appropriately prevented, making it easier to improve the oxidation stability at a high temperature.

The content of the glycidyl ether compound (E) is preferably 0.10 to 10.00% by mass based on the total amount of the refrigerator oil composition. By setting the content of the glycidyl ether compound (E) to 0.10% by mass or more, the acid in the refrigerator oil composition can be appropriately captured. As a result, an increase in the acid value of the refrigerator oil composition can be effectively prevented, and it becomes easier to improve the high temperature stability. Further, by setting the content to 10.00% by mass or less, it is possible to achieve an effect commensurate with the content.

Moreover, the content of the glycidyl ether compound (E) is more preferably 0.4% by mass or more, and still more preferably 0.5% by mass or more. In addition, it is more preferably 5% by mass or less, even more preferably 4% by mass or less, and still more preferably 3% by mass or less. The upper limit values and the lower limit values of these numerical ranges can be arbitrarily combined. Specifically, it is more preferably 0.4% by mass to 5% by mass, even more preferably 0.5% by mass to 4% by mass, and still more preferably 0.5% by mass to 3% by mass.

The glycidyl ether compound (E) may be used alone or may be used in combination of two or more thereof.

<Content Ratio of Modified Silicone Compound (B) and Glycidyl Ether Compound (E)>

When the refrigerator oil composition of the present embodiment contains the glycidyl ether compound (E), from the viewpoint of further easily improving the effects of the present invention, the content ratio of the modified silicone compound (B) and the glycidyl ether compound (E) [(B)/(E)] is, in terms of mass ratio, preferably 0.01 or more, more preferably 0.03 or more, and still more preferably 0.04 or more. Further, it is preferably 5.0 or less, more preferably 2.0 or less, and still more preferably 1.0 or less.

<Content Ratio of Epoxy Compound (C) and Glycidyl Ether Compound (E)>

When the refrigerator oil composition of the present embodiment contains the glycidyl ether compound (E), from the viewpoint of further easily improving the effects of the present invention, the content ratio of the epoxy compound (C) and the glycidyl ether compound (E) [(C)/(E)] is, in terms of mass ratio, preferably 0.01 or more, more preferably 0.03 or more, and still more preferably 0.04 or more. Further, it is preferably 5.0 or less, more preferably 2.0 or less, and still more preferably 1.0 or less.

<Stabilizer (F)>

The refrigerator oil composition of the present embodiment may further contain a stabilizer (F).

Examples of the stabilizer (F) include aliphatic unsaturated compounds and terpenes having a double bond.

The aliphatic unsaturated compound is preferably an unsaturated hydrocarbon, and specific examples thereof include an olefin; and a polyene such as a diene and a triene. From the viewpoint of reactivity with oxygen, the olefin is preferably an α-olefin such as 1-tetradecene, 1-hexadecene, and 1-octadecene.

As the aliphatic unsaturated compound other than those described above, unsaturated aliphatic alcohols having conjugated double bonds such as vitamin A ((2E,4E,6E,8E)-3,7-dimethyl-9-(2,6,6-trimethylcyclohexen-1-yl)nona-2,4,6,8-tetraen-1-ol) represented by the molecular formula $C_{20}H_{30}O$ are preferable from the viewpoint of reactivity with oxygen.

As the terpene having a double bond, a terpene-based hydrocarbon having a double bond is preferable, and from the viewpoint of reactivity with oxygen, α-pinene, β-pinene, α-farnesene ($C_{15}H_{24}$: 3,7,11-trimethyldodeca-1,3,6,10-tetraene) and β-farnesene ($C_{15}H_{24}$: 7,11-dimethyl-3-methylidenedodeca-1,6,10-triene) are more preferable.

The content of the stabilizer (F) is preferably 0.10% by mass or more, more preferably 0.20% by mass or more, and still more preferably 0.30% by mass or more, based on the total amount of the refrigerator oil composition. In addition, it is preferably 8.0% by mass or less, more preferably 5.0% by mass or less, and still more preferably 3.0% by mass or less.

The upper limit values and the lower limit values of these numerical ranges can be arbitrarily combined. Specifically, it is more preferably 0.10% by mass to 8.0% by mass, even more preferably 0.20% by mass to 5.0% by mass, and still more preferably 0.30% by mass to 3.0% by mass.

The stabilizer (F) may be used alone or may be used in combination of two or more thereof.

<Content Ratio of Modified Silicone Compound (B) and Stabilizer (F)>

When the refrigerator oil composition of the present embodiment contains the stabilizer (F), from the viewpoint of further easily improving the effects of the present invention, the content ratio of the modified silicone compound (B) and the stabilizer (F) [(B)/(F)] is, in terms of mass ratio, preferably 0.01 or more, more preferably 0.04 or more, and still more preferably 0.06 or more. Further, it is preferably 5.0 or less, more preferably 3.0 or less, and still more preferably 1.0 or less.

(Content Ratio of Epoxy Compound (C) and Stabilizer (F))

When the refrigerator oil composition of the present embodiment contains the stabilizer (F), from the viewpoint of further easily improving the effects of the present invention, the content ratio of the epoxy compound (C) and the stabilizer (F) [(C)/(F)] is, in terms of mass ratio, preferably 0.01 or more, more preferably 0.04 or more, and still more preferably 0.06 or more. Further, it is preferably 5.0 or less, more preferably 3.0 or less, and still more preferably 1.0 or less.

<Other Additives>

The refrigerator oil composition of the present embodiment may contain other additives (hereinafter also referred to as "additional additives") in addition to the modified silicone compound (B), the epoxy compound (C), the antioxidant (D), the glycidyl ether compound (E), and the stabilizer (F).

Examples of the additional additives include an extreme pressure agent and an anti-foaming agent.

That is, the refrigerator oil composition of the present embodiment may consist only of the base oil (A), the modified silicone compound (B), and the epoxy compound (C), or may further contain, in addition to the base oil (A), the modified silicone compound (B), and the epoxy compound (C), one or more selected from the group consisting of the antioxidant (D), the glycidyl ether compound (E), the stabilizer (F), an extreme pressure agent, and an anti-foaming agent.

(Extreme Pressure Agent)

The extreme pressure agent is preferably a phosphorus-based extreme pressure agent, a metal salt of carboxylic acid, or a sulfur-based extreme pressure agent.

Examples of the phosphorus-based extreme pressure agent include phosphate esters, acidic phosphate esters, phosphite esters, acidic phosphite esters, and amine salts thereof.

Among these, from the viewpoint of improving extreme pressure properties and friction characteristics, one or more selected from tricresyl phosphate (TCP), trithiophenyl phosphate, tri(nonylphenyl) phosphite, dioleyl hydrogen phosphite, and 2-ethylhexyl diphenyl phosphite are preferable, and tricresyl phosphate (TCP) is more preferable.

Examples of metal salts of carboxylic acids include metal salts of carboxylic acids having 3 to 60 (preferably 3 to 30) carbon atoms.

Among these, one or more selected from metal salts of fatty acids having 12 to 30 carbon atoms and metal salts of dicarboxylic acids having 3 to 30 carbon atoms are preferred.

In addition, the metal constituting the metal salt is preferably an alkali metal or an alkaline earth metal, and more preferably an alkali metal.

Examples of the sulfur-based extreme pressure agent include sulfurized fats and oils, sulfurized fatty acids, sulfurized esters, sulfurized olefins, dihydrocarbyl polysulfides, thiocarbamates, thioterpenes, and dialkyl thiodipropionates.

(Anti-Foaming Agent)

Examples of the anti-foaming agent include silicone anti-foaming agents such as silicone oils and fluorinated silicone oils.

The silicone compound used as an anti-foaming agent is an unmodified silicone compound that is not classified as the modified silicone compound (B).

[Method for Producing Refrigerator Oil Composition]

A method for producing the above refrigerator oil composition is not particularly limited.

For example, the method for producing the refrigerator oil composition of the present embodiment is a method for producing a refrigerator oil composition used in a refrigerant containing one or more unsaturated fluorinated hydrocarbon compounds selected from compounds represented by the following general formula (1):

$$C_xF_yH_z \quad (1)$$

wherein x is an integer of 2 to 6, y is an integer of 1 to 11, z is an integer of 1 to 11, and there are one or more carbon-carbon unsaturated bonds in the molecule, the method for producing a refrigerator oil composition including a step of mixing a base oil (A) that includes polyvinyl ether, a modified silicone compound (B), and an epoxy compound (C) that satisfies the following requirements (α) and (β).

Requirement (α): having at least one divalent group represented by the following formula (2) in the molecule.

(2)

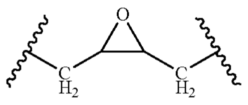

Requirement (β): having at least one ester group in the molecule.

The method for mixing the above components is not particularly limited, and examples thereof include a method including a step of blending the modified silicone compound (B) and the epoxy compound (C) into the base oil (A). The antioxidant (D), the glycidyl ether compound (E), the stabilizer (F), and other additives may be respectively blended into the base oil (A) at the same time as the modified silicone compound (B) and the epoxy compound (C) are blended into the base oil (A), or may be blended separately. Each component may also be blended in the form of a solution (dispersion) with the addition of dilution oil or other substances. After blending each component, it is preferable to stir and uniformly disperse the components by a known method.

[Physical Properties of Refrigerator Oil Composition]

In the present embodiment, the physical property values of the refrigerator oil composition after a thermal stability test described in the Examples, which will be described later, are as follows.

<Acid Value>

The acid value of the refrigerator oil composition after the thermal stability test described in the Examples that will be described later is preferably less than 0.17 mgKOH/g, more preferably 0.16 mgKOH/g or less, even more preferably 0.14 mgKOH/g or less, still more preferably 0.12 mgKOH/g or less, further more preferably 0.10 mgKOH/g or less, and still further more preferably 0.09 mgKOH/g or less.

<Fluorine Amount>

The amount of fluorine in the refrigerator oil composition after the thermal stability test described in the Examples to be described later is preferably less than 19 mass ppm, more preferably 15 mass ppm or less, even more preferably 12 mass ppm or less, still more preferably 10 mass ppm or less, and further more preferably 9 mass ppm or less, based on the total amount of the refrigerator oil composition.

[Mixed Composition for Refrigerator]

The refrigerator oil composition is mixed with a refrigerant and used as a mixed composition for a refrigerator.

That is, the mixed composition for a refrigerator contains the above-mentioned refrigerator oil composition and a refrigerant.

Hereinafter, the refrigerant will be described.

<Refrigerant>

The refrigerant used in the present embodiment is a refrigerant containing one or more unsaturated fluorinated hydrocarbon compounds selected from compounds represented by the following general formula (1):

$$C_xF_yH_z \quad (1)$$

wherein x is an integer of 2 to 6, y is an integer of 1 to 11, z is an integer of 1 to 11, and there are one or more carbon-carbon unsaturated bonds in a molecule.

The general formula (1) represents the type and number of elements in a molecule, and specifically represents an unsaturated fluorinated hydrocarbon compound having 2 to 6 carbon atoms C. The unsaturated fluorinated hydrocarbon compound having 2 to 6 carbon atoms has physical and chemical properties such as a boiling point, a freezing point, and a latent heat of vaporization required as a refrigerant.

In the general formula (1), the bonding form of the x carbon atoms represented by $C_x$ includes unsaturated bonds such as a carbon-carbon single bond and a carbon-carbon double bond. The carbon-carbon unsaturated bond is preferably a carbon-carbon double bond from the viewpoint of stability, and the unsaturated fluorinated hydrocarbon compound has one or more unsaturated bonds such as a carbon-carbon double bond in the molecule, and the number thereof is preferably 1. That is, at least one of the bonding forms of x carbon atoms represented by $C_x$ is more preferably a carbon-carbon double bond.

Preferred examples of the unsaturated fluorinated hydrocarbon compound include fluorides of a linear or branched chain olefin having 2 to 6 carbon atoms and a cyclic olefin having 4 to 6 carbon atoms.

Specifically, a fluoride of ethylene into which 1 to 3 fluorine atoms are introduced, a fluoride of propene into which 1 to 5 fluorine atoms are introduced, a fluoride of butene into which 1 to 7 fluorine atoms are introduced, a fluoride of pentene into which 1 to 9 fluorine atoms are introduced, a fluoride of hexene into which 1 to 11 fluorine atoms are introduced, a fluoride of cyclobutene into which 1 to 5 fluorine atoms are introduced, a fluoride of cyclopentene into which 1 to 7 fluorine atoms are introduced, and a fluoride of cyclohexene into which 1 to 9 fluorine atoms are introduced can be mentioned.

Among these, a fluoride of propene is preferable, and propene into which 3 to 5 fluorine atoms are introduced is more preferable. To be specific, one or more selected from 1,3,3,3-tetrafluoropropene (R1234ze), 2,3,3,3-tetrafluoropropene (R1234yf), and 1,2,3,3-tetrafluoropropene (R1234ye) are preferable, and 2,3,3,3-tetrafluoropropene (R1234yf) is more preferable.

The above unsaturated fluorinated hydrocarbon compound may be used alone or may be used in combination of two or more thereof. Therefore, one selected from 1,3,3,3-tetrafluoropropene (R1234ze), 2,3,3,3-tetrafluoropropene (R1234yf), and 1,2,3,3-tetrafluoropropene (R1234ye) may be used alone.

(Other Refrigerant)

In the present embodiment, the refrigerant may be a mixed refrigerant containing other compounds as necessary in addition to the unsaturated fluorinated hydrocarbon compound represented by the above general formula (1); for example, the refrigerant may contain a saturated fluorinated hydrocarbon compound.

The saturated fluorinated hydrocarbon compound is preferably a fluoride of an alkane having 1 to 4 carbon atoms, more preferably a fluoride of an alkane having 1 to 3 carbon atoms, and still more preferably a fluoride of an alkane having 1 or 2 carbon atoms (methane or ethane). Examples of the fluoride of methane or ethane include trifluoromethane (R23), difluoromethane (R32), 1,1-difluoroethane (R152a), 1,1,1-trifluoroethane (R143a), 1,1,2-trifluoroethane (R143), 1,1,1,2-tetrafluoroethane (R134a), 1,1,2,2-tetrafluoroethane (R134), and 1,1,1,2,2-pentafluoroethane (R125), and among these, difluoromethane and 1,1,1,2,2-pentafluoroethane are preferred.

These saturated fluorinated hydrocarbon compounds may be used alone or may be used in combination of two or more thereof.

Further, the refrigerant may include a natural refrigerant. Examples of the natural refrigerant include a hydrocarbon-based refrigerant (HC), carbon dioxide ($CO_2$, carbon dioxide gas), and ammonia. These natural refrigerants may be used alone or may be used in combination of two or more thereof.

As the hydrocarbon-based refrigerant, a hydrocarbon having 1 or more and 8 or less carbon atoms is preferable, a hydrocarbon having 1 or more and 5 or less carbon atoms is more preferable, and a hydrocarbon having 3 or more and 5 or less carbon atoms is still more preferable. When the number of carbon atoms is 8 or less, the boiling point of the refrigerant does not become too high, which is preferable as a refrigerant. Examples of the hydrocarbon-based refrigerant include one or more selected from the group consisting of methane, ethane, ethylene, propane (R290), cyclopropane, propylene, n-butane, isobutane (R600a), 2-methylbutane, n-pentane, isopentane, cyclopentane isobutane, and normal hexane, and these may be used alone or may be used in combination of two or more thereof.

(Content of Unsaturated Fluorinated Hydrocarbon Compounds in Refrigerant)

n the present embodiment, the refrigerant contains an unsaturated fluorinated hydrocarbon compound represented by the above general formula (1).

The content of the unsaturated fluorinated hydrocarbon compound represented by the above general formula (1) is preferably 50% by mass to 100% by mass, more preferably 60% by mass to 100% by mass, still more preferably 70% by mass to 100% by mass, even more preferably 80% by mass to 100% by mass, further preferably 90% by mass to 100% by mass, and still further preferably 100% by mass (that is, a refrigerant consisting only of unsaturated fluorinated hydrocarbon compounds), based on the total amount of the refrigerant.

The refrigerator oil composition of the present embodiment has an excellent effect of suppressing an increase in the acid value even when the refrigerant has such a high content of unsaturated fluorinated hydrocarbon compounds.

(Amount of Refrigerant and Refrigerator Oil Composition Used)

In the mixed composition for a refrigerator of the present embodiment, the amount of the refrigerant and the refrigerator oil composition used is preferably 1/99 to 90/10, more preferably 5/95 to 70/30, in mass ratio of the refrigerator oil composition to the refrigerant [(refrigerator oil composition)/(refrigerant)]. When the mass ratio of the refrigerator oil composition to the refrigerant is within this range, lubricity and suitable refrigerating capacity of the refrigerator can be obtained.

[Application of Refrigerator Oil Composition and Mixed Composition for Refrigerator]

The refrigerator oil composition and the mixed composition for a refrigerator are preferably used in, for example, an air conditioner, a refrigerator, a vending machine, a showcase, a refrigeration system, a hot water supply system, or a heating system. Examples of the air conditioner include car air conditioners such as open-type car air conditioners and electric car air conditioners; and gas heat pump (GHP) air conditioners.

[One Embodiment of the Present Invention Provided]

In one embodiment of the present invention, the following [1] to [14] are provided.

[1]A refrigerator oil composition used in a refrigerant containing one or more unsaturated fluorinated hydrocarbon compounds selected from compounds represented by the following general formula (1):

$$C_xF_yH_z \quad (1)$$

wherein x is an integer of 2 to 6, y is an integer of 1 to 11, z is an integer of 1 to 11, and there are one or more carbon-carbon unsaturated bonds in a molecule, the refrigerator oil composition containing a base oil (A) that includes polyvinyl ether, a modified silicone compound (B), and an epoxy compound (C) that satisfies the following requirements (α) and (β):

requirement (α): having at least one divalent group represented by the following formula (2) in the molecule, (2)

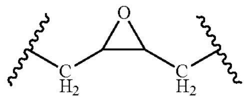

requirement (β): having at least one ester group in the molecule.

[2] The refrigerator oil composition according to [1], wherein the modified silicone compound (B) contains a side chain modified silicone (B1) in which at least a side chain of a polysiloxane skeleton is modified.

[3] The refrigerator oil composition according to [2], wherein the side chain modified silicone (B1) includes one or more selected from the group consisting of a side chain modified silicone (B1a) having one or more epoxy groups in the side chain and a side chain modified silicone (B2a) having one or more polyether groups in the side chain.

[4] The refrigerator oil composition according to any one of [1] to [3], wherein a content of the modified silicone compound (B) is 0.05% by mass or more based on a total amount of the refrigerator oil composition.

[5] The refrigerator oil composition according to any one of [1] to [4], wherein the epoxy compound (C) has a molecular weight of 300 or more.

[6] The refrigerator oil composition according to any one of [1] to [5], wherein the epoxy compound (C) is one or more selected from the group consisting of an epoxidized fatty acid ester ($C_1$) and an epoxidized vegetable oil ($C_2$).

[7] The refrigerator oil composition according to [6], wherein the epoxidized fatty acid ester (C1) is represented by the following general formula (c1), (c1)

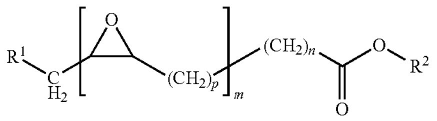

wherein $R^1$ is a hydrocarbon group having 4 to 20 carbon atoms, $R^2$ is a hydrocarbon group having 1 to 10 carbon atoms, p is an integer of 1 to 3, n is an integer of 0 to 12, and m is an integer of 1 to 3; when m is 2 or more, a plurality of structures in brackets [ ] may be the same as or different from each other.

[8] The refrigerator oil composition according to any one of [1] to [7], wherein a content of the epoxy compound (C) is 0.05% by mass or more based on the total amount of the refrigerator oil composition.

[9] The refrigerator oil composition according to any one of [1] to [8], wherein a content ratio of the modified silicone compound (B) and the epoxy compound (C) [(B)/(C)] is 0.10 or more in mass ratio.

[10] The refrigerator oil composition according to any one of [1] to [9], further containing one or more additives selected from the group consisting of an antioxidant (D), a glycidyl ether compound (E), a stabilizer (F), an extreme pressure agent, and an anti-foaming agent.

[11] The refrigerator oil composition according to any one of [1] to [10], wherein the unsaturated fluorinated hydrocarbon compound includes one or more selected from the group consisting of R1234ze, R1234yf, and R1234ye.

[12] The refrigerator oil composition according to any one of [1] to [11], wherein the refrigerant consists only of the unsaturated fluorinated hydrocarbon compound.

[13] A mixed composition for a refrigerator, containing the refrigerator oil composition according to any one of [1] to [12], and a refrigerant containing one or more unsaturated fluorinated hydrocarbon compounds selected from compounds represented by the following general formula (1):

$$C_xF_yH_z \quad (1)$$

wherein x is an integer of 2 to 6, y is an integer of 1 to 11, z is an integer of 1 to 11, and there are one or more carbon-carbon unsaturated bonds in a molecule.

[14] A method for producing a refrigerator oil composition used in a refrigerant containing one or more unsaturated fluorinated hydrocarbon compounds selected from compounds represented by the following general formula (1):

$$C_xF_yH_z \quad (1)$$

wherein x is an integer of 2 to 6, y is an integer of 1 to 11, z is an integer of 1 to 11, and there are one or more carbon-carbon unsaturated bonds in a molecule, the method for producing a refrigerator oil composition including a step of mixing a base oil (A) that includes polyvinyl ether, a modified silicone compound (B), and an epoxy compound (C) that satisfies the following requirements (α) and (β):

requirement (α): having at least one divalent group represented by the following formula (2) in the molecule, (2)

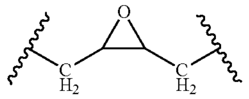

requirement (β): having at least one ester group in the molecule.

EXAMPLES

The present invention will be specifically described with reference to the following Examples. However, the present invention is not limited to the following Examples.

[Measurement Method of Various Physical Property Values]

The measurement of each property of each raw material used in each of Examples and Comparative Examples and the refrigerator oil composition of each of Examples and Comparative Examples was performed according to the following procedure.

(1) Kinematic Viscosity at 100° C.

The kinematic viscosity at 100° C. of the base oil (A) was measured according to JIS K2283:2000.

(2) Hydroxyl Value

The hydroxyl value of the base oil (A) was measured by a neutralization titration method according to JIS K0070: 1992.

(3) Number Average Molecular Weight (Mn)

The number average molecular weight (Mn) of the base oil (A) was measured using a gel permeation chromatography (GPC) device.

For GPC, the measurement was performed using two "TSKgel Super Multipore HZ-M" manufactured by Tosoh Corporation connected in sequence as a column, tetrahydrofuran as an eluent, and a refractive index detector (RI detector) as the detector, and the number average molecular weight (Mn) was determined using polystyrene as a standard sample.

[Details of Each Component Used in Preparation of Refrigerator Oil Composition]

The details of each component used in the preparation of the refrigerator oil composition are shown below.

<Base Oil (A)>

(PVE-A)

Copolymer of polyethyl vinyl ether (PEVE) and polyisobutyl vinyl ether (PIBVE) (copolymerization ratio (PEVE/PIBVE)=9/1 (mole ratio)), kinematic viscosity at 100° C.=8.4 $mm^2/s$, hydroxyl value=1 mgKOH/g, number average molecular weight=940 (PVE-B)

Polyethyl vinyl ether, kinematic viscosity at 100° C.=8.6 $mm^2/s$, hydroxyl value=1 mgKOH/g, number average molecular weight=1100

<Modified Silicone Compound (B)>

"Epoxy modified silicone": KF-101 (manufactured by Shin-Etsu Chemical Co., Ltd.)

"Alicyclic epoxy modified silicone": KF-102 (Manufactured by Shin-Etsu Chemical Co., Ltd.)

"Polyether modified silicone": KF-945 (Shin-Etsu Chemical Co., Ltd.), HLB value=4

The epoxy modified silicone and the alicyclic epoxy modified silicone are modified silicones that correspond to the side chain modified silicone (B1a) having one or more epoxy groups in the side chain.

The polyether modified silicone is a modified silicone that corresponds to the side chain modified silicone (Bib) having one or more polyether groups in the side chain.

<Epoxy Compound (C)>

"Epoxy compound 1": Epoxidized soybean oil represented by the following formula, molecular weight: 933, Sansocizer E-2000H (manufactured by New Japan Chemical Co., Ltd.)

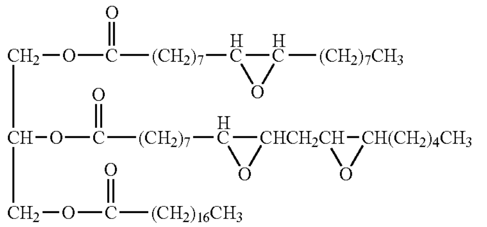

The epoxidized soybean oil represented by the above formula is an epoxy compound corresponding to the epoxidized vegetable oil ($C_2$).

"Epoxy compound 2": Epoxidized soybean oil represented by the following formula, molecular weight: 947, Nusizer 510R (manufactured by NOF Corporation)

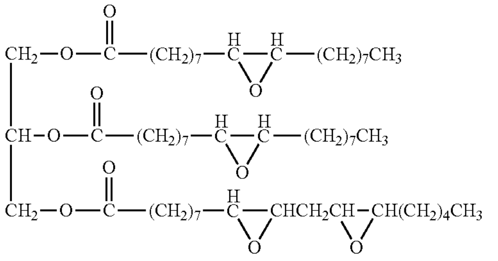

The epoxidized soybean oil represented by the above formula is an epoxy compound corresponding to the epoxidized vegetable oil ($C_2$).

"Epoxy compound 3": Epoxidized fatty acid ester represented by the following formula, molecular weight: 411, Sansocizer E-6000 (manufactured by New Japan Chemical Co., Ltd.)

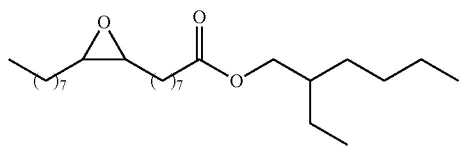

The epoxidized fatty acid ester represented by the above formula is an epoxy compound corresponding to the epoxidized fatty acid ester ($C_1$).

"Epoxy compound 4": Epoxidized fatty acid ester ($C_{17}H_{33}OCOOC_8H_{17}$), molecular weight: 411, Chemisizer T-5000 (manufactured by Sanwa Gosei Kagaku Co., Ltd.)

The epoxy compound 4 is an epoxy compound corresponding to epoxidized fatty acid ester ($C_1$).

<Antioxidant (D)>

Di-tert-butyl-p-cresol (DBPC)

<Glycidyl Ether Compound (E)>

2-ethylhexyl glycidyl ether

<Stabilizer (F)>

β-pinene

<Other Additives>

Extreme pressure agent (tricresyl phosphate), silicone-based anti-foaming agent

The silicone-based anti-foaming agent is an unmodified silicone compound that is not classified as the modified silicone compound (B).

EXAMPLES, COMPARATIVE EXAMPLES

Refrigerator oil compositions having the compositions shown in Tables 1 to 3 were prepared by mixing the above components, and the thermal stability test described below was conducted.

The numerical unit of the blending composition in Tables 1 to 3 is "% by mass".

Furthermore, the content of the modified silicone compound (B) in Tables 1 to 3 means the content in terms of solid content.

<Thermal Stability Test>

It was conducted in accordance with JIS K2211:2009 Annex C.

Specifically, a mixed composition for a refrigerator (water content 500 mass ppm, air content 25 mL) obtained by mixing 30 g of the refrigerator oil compositions of the Examples and Comparative Examples and 30 g of R1234yf, and a metal catalyst consisting of iron, copper, and aluminum were sealed in an autoclave tube with an internal volume of 200 mL. Thereafter, after evacuating, sealing the tube and keeping it at a temperature of 175° C. for 14 days, the oil appearance, catalyst appearance (presence or absence of deterioration), and the presence or absence of precipitates (color of precipitates, if any) were visually observed.

The oil appearance is evaluated using ASTM color, and those judged to be 0.5 or less (L0.5) were judged to have good oil appearance, and those judged to be greater than 0.5 (L1.0, L1.5, and so on) were judged to have poor oil appearance.

Further, after the thermal stability test, the acid value of the refrigerator oil composition and the amount of fluorine in the refrigerator oil composition were evaluated by the method described below.

(Evaluation of Acid Value of Refrigerator Oil Composition)

Measurement was performed according to JIS K2501:2003 using an indicator photometric titration method (see Appendix 1 in the JIS standard on the left).

(Evaluation of Fluorine Amount in Refrigerator Oil Composition)

The amount of fluorine in the refrigerator oil composition was measured by separating the refrigerant from the mixed composition for a refrigerator after an autoclave test, and detecting fluorine ions ($F^-$) in the refrigerator oil composition according to JIS K 0127:2013 (general rules for ion chromatography analysis).

TABLE 1

(PVE-A)

| | | | Examples | | | | | |
|---|---|---|---|---|---|---|---|---|
| | | | I-1 | I-2 | I-3 | I-4 | I-5 | I-6 |
| Blending composition (% by mass) | Base oil (A) | PVE-A | 94.60 | 93.70 | 95.00 | 95.00 | 94.10 | 95.00 |
| | Modified silicone compound (B) | KF-101 | 0.10 | 1.00 | 0.10 | 0.10 | 1.00 | 0.10 |
| | | KF-102 | — | — | — | — | — | — |
| | | KF-945 | — | — | — | — | — | — |
| | Epoxy compound (C) | E-2000H | 0.50 | 0.50 | — | — | — | — |
| | | 510R | — | — | 0.10 | — | — | — |
| | | E-6000 | — | — | — | 0.10 | 0.10 | — |
| | | T-5000 | — | — | — | — | — | 0.10 |
| | Antioxidant (D) | | 0.30 | 0.30 | 0.30 | 0.30 | 0.30 | 0.30 |
| | Glycidyl ether compound (E) | | 2.00 | 2.00 | 2.00 | 2.00 | 2.00 | 2.00 |
| | Stabilizer (F) | | 1.40 | 1.40 | 1.40 | 1.40 | 1.40 | 1.40 |
| | Other additives | | 1.10 | 1.10 | 1.10 | 1.10 | 1.10 | 1.10 |
| | Total | | 100.00 | 100.00 | 100.00 | 100.00 | 100.00 | 100.00 |
| Various ratios (mass ratio) | (B)/(C) | | 0.20 | 2.00 | 1.00 | 1.00 | 10.00 | 1.00 |
| | (B)/(D) | | 0.33 | 3.33 | 0.33 | 0.33 | 3.33 | 0.33 |
| | (B)/(E) | | 0.05 | 0.50 | 0.05 | 0.05 | 0.50 | 0.05 |
| | (B)/(F) | | 0.07 | 0.71 | 0.07 | 0.07 | 0.71 | 0.07 |
| | (C)/(D) | | 1.67 | 1.67 | 0.33 | 0.33 | 0.33 | 0.33 |
| | (C)/(E) | | 0.25 | 0.25 | 0.05 | 0.05 | 0.05 | 0.05 |
| | (C)/(F) | | 0.36 | 0.36 | 0.07 | 0.07 | 0.07 | 0.07 |
| Thermal stability test | | Oil appearance | L0.5 | L0.5 | L0.5 | L0.5 | L0.5 | L0.5 |
| | | Catalyst appearance | No color change | No color change | No color change | No color change | No color change | No color change |
| | | Acid value (mgKOH/g) | 0.11 | 0.08 | 0.13 | 0.08 | 0.06 | 0.08 |
| | | $F^-$ (mass ppm) | 9 | 6 | 9 | 6 | 5 | 8 |
| | | Precipitate | No | No | No | No | No | No |

| | | | Examples | | | | | |
|---|---|---|---|---|---|---|---|---|
| | | | I-7 | I-8 | I-9 | I-10 | I-11 | I-12 |
| Blending composition (% by mass) | Base oil (A) | PVE-A | 95.00 | 93.70 | 94.60 | 95.00 | 95.00 | 95.00 |
| | Modified silicone compound (B) | KF-101 | — | — | — | — | — | — |
| | | KF-102 | 0.10 | 1.00 | — | — | — | — |
| | | KF-945 | — | — | 0.10 | 0.10 | 0.10 | 0.10 |
| | Epoxy compound (C) | E-2000H | — | 0.50 | 0.50 | — | — | — |
| | | 510R | — | — | — | 0.10 | — | — |
| | | E-6000 | — | — | — | — | 0.10 | — |
| | | T-5000 | 0.10 | — | — | — | — | 0.10 |
| | Antioxidant (D) | | 0.30 | 0.30 | 0.30 | 0.30 | 0.30 | 0.30 |
| | Glycidyl ether compound (E) | | 2.00 | 2.00 | 2.00 | 2.00 | 2.00 | 2.00 |
| | Stabilizer (F) | | 1.40 | 1.40 | 1.40 | 1.40 | 1.40 | 1.40 |
| | Other additives | | 1.10 | 1.10 | 1.10 | 1.10 | 1.10 | 1.10 |
| | Total | | 100.00 | 100.00 | 100.00 | 100.00 | 100.00 | 100.00 |
| Various ratios (mass ratio) | (B)/(C) | | 1.00 | 2.00 | 0.20 | 1.00 | 1.00 | 1.00 |
| | (B)/(D) | | 0.33 | 3.33 | 0.33 | 0.33 | 0.33 | 0.33 |
| | (B)/(E) | | 0.05 | 0.50 | 0.05 | 0.05 | 0.05 | 0.05 |
| | (B)/(F) | | 0.07 | 0.71 | 0.07 | 0.07 | 0.07 | 0.07 |
| | (C)/(D) | | 0.33 | 1.67 | 1.67 | 0.33 | 0.33 | 0.33 |
| | (C)/(E) | | 0.05 | 0.25 | 0.25 | 0.05 | 0.05 | 0.05 |
| | (C)/(F) | | 0.07 | 0.36 | 0.36 | 0.07 | 0.07 | 0.07 |
| Thermal stability test | | Oil appearance | L0.5 | L0.5 | L0.5 | L0.5 | L0.5 | L0.5 |
| | | Catalyst appearance | No color change | No color change | No color change | No color change | No color change | No color change |
| | | Acid value (mgKOH/g) | 0.08 | 0.09 | 0.11 | 0.13 | 0.09 | 0.09 |
| | | $F^-$ (mass ppm) | 9 | 4 | 8 | 8 | 6 | 8 |
| | | Precipitate | No | No | No | No | No | No |

TABLE 2

(PVE-A)

| | | | Comparative Examples | | | | |
|---|---|---|---|---|---|---|---|
| | | | I-1 | I-2 | I-3 | I-4 | I-5 |
| Blending composition (% by mass) | Base oil (A) | PVE-A | 95.20 | 95.10 | 94.20 | 95.10 | 95.10 |
| | Modified silicone compound (B) | KF-101 | — | 0.10 | 1.00 | — | — |
| | | KF-102 | — | — | — | 0.10 | — |
| | | KF-945 | — | — | — | — | 0.10 |
| | Epoxy compound (C) | E-2000H | — | — | — | — | — |
| | | 510R | — | — | — | — | — |
| | | E-6000 | — | — | — | — | — |
| | | T-5000 | — | — | — | — | — |
| | Antioxidant (D) | | 0.30 | 0.30 | 0.30 | 0.30 | 0.30 |
| | Glycidyl ether compound (E) | | 2.00 | 2.00 | 2.00 | 2.00 | 2.00 |
| | Stabilizer (F) | | 1.40 | 1.40 | 1.40 | 1.40 | 1.40 |
| | Other additives | | 1.10 | 1.10 | 1.10 | 1.10 | 1.10 |
| | Total | | 100.00 | 100.00 | 100.00 | 100.00 | 100.00 |
| Various ratios (mass ratio) | (B)/(C) | | — | — | — | — | — |
| | (B)/(D) | | 0.00 | 0.33 | 3.33 | 0.33 | 0.33 |
| | (B)/(E) | | 0.00 | 0.05 | 0.50 | 0.05 | 0.05 |
| | (B)/(F) | | 0.00 | 0.07 | 0.71 | 0.07 | 0.07 |
| | (C)/(D) | | 0.00 | 0.00 | 0.00 | 0.00 | 0.00 |
| | (C)/(E) | | 0.00 | 0.00 | 0.00 | 0.00 | 0.00 |
| | (C)/(F) | | 0.00 | 0.00 | 0.00 | 0.00 | 0.00 |
| Thermal stability test | | Oil appearance | L0.5 | L0.5 | L0.5 | L0.5 | L0.5 |
| | | Catalyst appearance | No color change | No color change | No color change | No color change | No color change |
| | | Acid value (mgKOH/g) | 0.25 | 0.27 | 0.19 | 0.20 | 0.17 |
| | | $F^-$ (mass ppm) | 25 | 30 | 20 | 25 | 27 |
| | | Precipitate | No | No | No | No | No |

| | | | Comparative Examples | | | |
|---|---|---|---|---|---|---|
| | | | I-6 | I-7 | I-8 | I-9 |
| Blending composition (% by mass) | Base oil (A) | PVE-A | 94.70 | 95.10 | 95.10 | 95.10 |
| | Modified silicone compound (B) | KF-101 | — | — | — | — |
| | | KF-102 | — | — | — | — |
| | | KF-945 | — | — | — | — |
| | Epoxy compound (C) | E-2000H | 0.50 | — | — | — |
| | | 510R | — | 0.10 | — | — |
| | | E-6000 | — | — | 0.10 | — |
| | | T-5000 | — | — | — | 0.10 |
| | Antioxidant (D) | | 0.30 | 0.30 | 0.30 | 0.30 |
| | Glycidyl ether compound (E) | | 2.00 | 2.00 | 2.00 | 2.00 |
| | Stabilizer (F) | | 1.40 | 1.40 | 1.40 | 1.40 |
| | Other additives | | 1.10 | 1.10 | 1.10 | 1.10 |
| | Total | | 100.00 | 100.00 | 100.00 | 100.00 |
| Various ratios (mass ratio) | (B)/(C) | | 0.00 | 0.00 | 0.00 | 0.00 |
| | (B)/(D) | | 0.00 | 0.00 | 0.00 | 0.00 |
| | (B)/(E) | | 0.00 | 0.00 | 0.00 | 0.00 |
| | (B)/(F) | | 0.00 | 0.00 | 0.00 | 0.00 |
| | (C)/(D) | | 1.67 | 0.33 | 0.33 | 0.33 |
| | (C)/(E) | | 0.25 | 0.05 | 0.05 | 0.05 |
| | (C)/(F) | | 0.36 | 0.07 | 0.07 | 0.07 |
| Thermal stability test | | Oil appearance | L0.5 | L0.5 | L0.5 | L0.5 |
| | | Catalyst appearance | No color change | No color change | No color change | No color change |
| | | Acid value (mgKOH/g) | 0.18 | 0.23 | 0.19 | 0.24 |
| | | $F^-$ (mass ppm) | 19 | 25 | 22 | 27 |
| | | Precipitate | No | No | No | No |

TABLE 3

(PVE-B)

| | | | Examples II-1 | Examples II-2 | Examples II-3 | Examples II-4 | Examples II-5 |
|---|---|---|---|---|---|---|---|
| Blending composition (% by mass) | Base oil (A) | PVE-B | 95.00 | 95.00 | 95.00 | 95.00 | 94.10 |
| | Modified silicone compound (B) | KF-101 | 0.10 | — | — | 0.10 | 1.00 |
| | | KF-102 | — | 0.10 | — | — | — |
| | | KF-945 | — | — | 0.10 | — | — |
| | Epoxy compound (C) | E-2000H | 0.10 | 0.10 | 0.10 | — | — |
| | | E-6000 | — | — | — | 0.10 | 0.10 |
| | Antioxidant (D) | | 0.30 | 0.30 | 0.30 | 0.30 | 0.30 |
| | Glycidyl ether compound (E) | | 2.00 | 2.00 | 2.00 | 2.00 | 2.00 |
| | Stabilizer (F) | | 1.40 | 1.40 | 1.40 | 1.40 | 1.40 |
| | Other additives | | 1.10 | 1.10 | 1.10 | 1.10 | 1.10 |
| | Total | | 100.00 | 100.00 | 100.00 | 100.00 | 100.00 |
| Various ratios (mass ratio) | (B)/(C) | | 1.00 | 1.00 | 1.00 | 1.00 | 10.00 |
| | (B)/(D) | | 0.33 | 0.33 | 0.33 | 0.33 | 3.33 |
| | (B)/(E) | | 0.05 | 0.05 | 0.05 | 0.05 | 0.50 |
| | (B)/(F) | | 0.07 | 0.07 | 0.07 | 0.07 | 0.71 |
| | (C)/(D) | | 0.33 | 0.33 | 0.33 | 0.33 | 0.33 |
| | (C)/(E) | | 0.05 | 0.05 | 0.05 | 0.05 | 0.05 |
| | (C)/(F) | | 0.07 | 0.07 | 0.07 | 0.07 | 0.07 |
| Thermal stability test | | Oil appearance | L0.5 | L0.5 | L0.5 | L0.5 | L0.5 |
| | | Catalyst appearance | No color change | No color change | No color change | No color change | No color change |
| | | Acid value (mgKOH/g) | 0.11 | 0.12 | 0.09 | 0.09 | 0.05 |
| | | $F^-$ (mass ppm) | 9 | 11 | 8 | 7 | 3 |
| | | Precipitate | No | No | No | No | No |
| | | | Examples II-6 | Examples II-7 | Examples II-8 | Comparative Examples II-1 | Comparative Examples II-2 |
| Blending composition (% by mass) | Base oil (A) | PVE-B | 95.00 | 94.10 | 95.00 | 95.20 | 95.10 |
| | Modified silicone compound (B) | KF-101 | — | — | — | — | 0.10 |
| | | KF-102 | 0.10 | 1.00 | — | — | — |
| | | KF-945 | — | — | 0.10 | — | — |
| | Epoxy compound (C) | E-2000H | — | — | — | — | — |
| | | E-6000 | 0.10 | 0.10 | 0.10 | — | — |
| | Antioxidant (D) | | 0.30 | 0.30 | 0.30 | 0.30 | 0.30 |
| | Glycidyl ether compound (E) | | 2.00 | 2.00 | 2.00 | 2.00 | 2.00 |
| | Stabilizer (F) | | 1.40 | 1.40 | 1.40 | 1.40 | 1.40 |
| | Other additives | | 1.10 | 1.10 | 1.10 | 1.10 | 1.10 |
| | Total | | 100.00 | 100.00 | 100.00 | 100.00 | 100.00 |
| Various ratios (mass ratio) | (B)/(C) | | 1.00 | 10.00 | 1.00 | — | — |
| | (B)/(D) | | 0.33 | 3.33 | 0.33 | 0.00 | 0.33 |
| | (B)/(E) | | 0.05 | 0.50 | 0.05 | 0.00 | 0.05 |
| | (B)/(F) | | 0.07 | 0.71 | 0.07 | 0.00 | 0.07 |
| | (C)/(D) | | 0.33 | 0.33 | 0.33 | 0.00 | 0.00 |
| | (C)/(E) | | 0.05 | 0.05 | 0.05 | 0.00 | 0.00 |
| | (C)/(F) | | 0.07 | 0.07 | 0.07 | 0.00 | 0.00 |
| Thermal stability test | | Oil appearance | L0.5 | L0.5 | L0.5 | L0.5 | L0.5 |
| | | Catalyst appearance | No color change | No color change | No color change | No color change | No color change |
| | | Acid value (mgKOH/g) | 0.07 | 0.04 | 0.07 | 0.27 | 0.30 |
| | | $F^-$ (mass ppm) | 5 | 3 | 7 | 23 | 33 |
| | | Precipitate | No | No | No | No | No |
| | | | Comparative Examples II-3 | Comparative Examples II-4 | Comparative Examples II-5 | Comparative Examples II-6 | Comparative Examples II-7 |
| Blending composition (% by mass) | Base oil (A) | PVE-B | 94.20 | 95.10 | 95.10 | 95.10 | 95.10 |
| | Modified silicone compound (B) | KF-101 | 1.00 | — | — | — | — |
| | | KF-102 | — | 0.10 | — | — | — |
| | | KF-945 | — | — | 0.10 | — | — |
| | Epoxy compound (C) | E-2000H | — | — | — | 0.10 | — |
| | | E-6000 | — | — | — | — | 0.10 |
| | Antioxidant (D) | | 0.30 | 0.30 | 0.30 | 0.30 | 0.30 |
| | Glycidyl ether compound (E) | | 2.00 | 2.00 | 2.00 | 2.00 | 2.00 |

TABLE 3-continued

| (PVE-B) | | | | | | |
|---|---|---|---|---|---|---|
| | Stabilizer (F) | 1.40 | 1.40 | 1.40 | 1.40 | 1.40 |
| | Other additives | 1.10 | 1.10 | 1.10 | 1.10 | 1.10 |
| | Total | 100.00 | 100.00 | 100.00 | 100.00 | 100.00 |
| Various ratios (mass ratio) | (B)/(C) | — | — | — | 0.00 | 0.00 |
| | (B)/(D) | 3.33 | 0.33 | 0.33 | 0.00 | 0.00 |
| | (B)/(E) | 0.50 | 0.05 | 0.05 | 0.00 | 0.00 |
| | (B)/(F) | 0.71 | 0.07 | 0.07 | 0.00 | 0.00 |
| | (C)/(D) | 0.00 | 0.00 | 0.00 | 0.33 | 0.33 |
| | (C)/(E) | 0.00 | 0.00 | 0.00 | 0.05 | 0.05 |
| | (C)/(F) | 0.00 | 0.00 | 0.00 | 0.07 | 0.07 |
| Thermal stability test | Oil appearance | L0.5 | L0.5 | L0.5 | L0.5 | L0.5 |
| | Catalyst appearance | No color change | No color change | No color change | No color change | No color change |
| | Acid value (mgKOH/g) | 0.24 | 0.26 | 0.25 | 0.21 | 0.20 |
| | $F^-$ (mass ppm) | 23 | 29 | 27 | 25 | 22 |
| | Precipitate | No | No | No | No | No |

The following can be found from Table 1 and Table 2.

It can be seen that the refrigerator oil compositions of Examples I-1 to 1-12 have an excellent effect of suppressing the increase in the acid value of the refrigerator oil composition after the thermal stability test, and the amount of fluorine in the refrigerator oil composition after the test is also small.

In contrast, the refrigerator oil compositions of Comparative Examples I-1 to 1-9 have an insufficient effect of suppressing the increase in the acid value of the refrigerator oil composition after the thermal stability test, and the amount of fluorine in the refrigerator oil composition after the test is also large.

From Table 3, the following can be found.

It can be seen that the refrigerator oil compositions of Examples II-1 to II-8 have an excellent effect of suppressing the increase in the acid value of the refrigerator oil composition after the thermal stability test, and the amount of fluorine in the refrigerator oil composition after the test is also small.

In contrast, the refrigerator oil compositions of Comparative Examples II-1 to II-7 have an insufficient effect of suppressing the increase in the acid value of the refrigerator oil composition after the thermal stability test, and the amount of fluorine in the refrigerator oil composition after the test is also large.

From the above results, it can be seen that a refrigerator oil composition containing the modified silicone compound (B) and the epoxy compound (C) has an excellent effect of suppressing the increase in the acid value of the refrigerator oil composition after the thermal stability test, and the amount of fluorine in the refrigerator oil composition after the test is also small.

The invention claimed is:

1. A mixed composition for a refrigerator, comprising:

a refrigerant comprising an unsaturated fluorinated hydrocarbon compound, and a refrigerator oil composition, comprising a base oil (A) that includes polyvinyl ether;

a modified silicone compound (B); and an epoxy compound (C):

which has at least one ester group and has at least one divalent group represented by the following formula (2), (2)

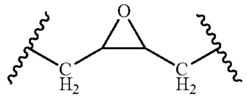

wherein the polyvinyl ether is a polymer (A-2) having one or more types of constitutional units represented by the following general formula (A-2), (A-2)

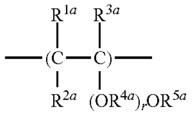

where $R^{1a}$, $R^{2a}$, and $R^{3a}$ each independently represent a hydrogen atom or a hydrocarbon group having 1 to 8 carbon atoms, $R^{4a}$ represents a divalent hydrocarbon group having 2 to 10 carbon atoms, $R^{5a}$ represents a hydrocarbon group having 1 to 10 carbon atoms, r is a number of repeating units of $OR^{4a}$ and is 0 to 10, and when a plurality of $OR^{4a}$'s exists in the constitutional unit represented by the general formula (A-2), the plurality of $OR^{4a}$'s may be the same as or different from each other, a content of the base oil (A) is 85.0% by mass to 99.0% by mass, based on a total amount of the refrigerator oil composition, the modified silicone compound (B) contains a side chain modified silicone (B1) in which at least a side chain of a polysiloxane skeleton is modified, the side chain modified silicone (B1) includes at least one selected from the group consisting of a side chain modified silicone (B1a) having one or more epoxy groups in the side chain and a side chain modified silicone (B2a) having one or more polyether groups in the side chain, a content of the modified silicone compound (B) is 0.10% to 3.0% by mass, based on a total amount of the refrigerator oil composition, the epoxy compound (C) is one or more selected from the group consisting of an epoxidized fatty acid ester (C1) and an epoxidized vegetable oil (C2), and a content of the epoxy compound (C) is 0.05% to 3.0% by mass, based on the total amount of the refrigerator oil composition.

2. The mixed composition for a refrigerator according to claim 1, wherein a content of the modified silicone compound (B) is 0.10% to 1.0% by mass based on the total amount of the refrigerator oil composition.

3. The mixed composition for a refrigerator according to claim 1, wherein the epoxy compound (C) has a molecular weight of 300 or more.

4. The mixed composition for a refrigerator according to claim 1, wherein the epoxidized fatty acid ester (C1) is represented by the following general formula (c1), (c1)

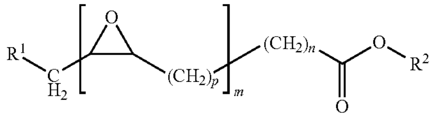

wherein $R^1$ is a hydrocarbon group having 4 to 20 carbon atoms, $R^2$ is a hydrocarbon group having 1 to 10 carbon atoms, p is an integer of 1 to 3, n is an integer of 0 to 12, and m is an integer of 1 to 3; when m is 2 or more, a plurality of structures in brackets [ ] may be the same as or different from each other.

5. The mixed composition for a refrigerator according to claim 1, wherein a content ratio of the modified silicone compound (B) and the epoxy compound (C) [(B)/(C)] is 0.10 or more by mass.

6. The mixed composition for a refrigerator according to claim 1, further comprising:

one or more additives selected from the group consisting of an antioxidant (D), a glycidyl ether compound (E), a stabilizer (F), an extreme pressure agent, and an anti-foaming agent.

7. The mixed composition for a refrigerator according to claim 1, wherein the unsaturated fluorinated hydrocarbon compound includes one or more selected from the group consisting of R1234ze, R1234yf, and R1234ye.

8. The mixed composition for a refrigerator according to claim 1, wherein the refrigerant consists of the unsaturated fluorinated hydrocarbon compound.

9. The mixed composition for a refrigerator, according to claim 1, wherein the unsaturated fluorinated hydrocarbon compound is represented by the following general formula (1):

$$C_xF_yH_z \quad (1)$$

wherein x is an integer of 2 to 6, y is an integer of 1 to 11, z is an integer of 1 to 11, and there are one or more carbon-carbon unsaturated bonds in a molecule.

10. A method for producing a mixed composition for a refrigerator comprising a refrigerator oil composition and a refrigerant, the method comprising:

mixing a base oil (A) that includes polyvinyl ether, a modified silicone compound (B), a refrigerant comprising an unsaturated fluorinated hydrocarbon compound, and an epoxy compound (C) which has at least one ester group and has at least one divalent group represented by the following formula (2), (2)

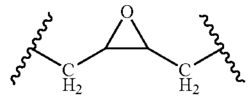

wherein the polyvinyl ether is a polymer (A-2) having one or more types of constitutional units represented by the following general formula (A-2), (A-2)

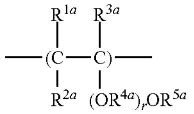

where $R^{1a}$, $R^{2a}$, and $R^{3a}$ each independently represent a hydrogen atom or a hydrocarbon group having 1 to 8 carbon atoms, $R^{4a}$ represents a divalent hydrocarbon group having 2 to 10 carbon atoms, $R^{5a}$ represents a hydrocarbon group having 1 to 10 carbon atoms, r is a number of repeating units of $OR^{4a}$ and is 0 to 10, and when a plurality of $OR^{4a}$'s exists in the constitutional unit represented by the general formula (A-2), the plurality of $OR^{4a}$'s may be the same as or different from each other, a content of the base oil (A) is 85.0% by mass to 99.0% by mass, based on a total amount of the refrigerator oil composition, the modified silicone compound (B) contains a side chain modified silicone (B1) in which at least a side chain of a polysiloxane skeleton is modified, the side chain modified silicone (B1) includes at least one selected from the group consisting of a side chain modified silicone (B1a) having one or more epoxy groups in the side chain and a side chain modified silicone (B2a) having one or more polyether groups in the side chain, a content of the modified silicone compound (B) is 0.10% to 3.0% by mass based on the total amount of the refrigerator oil composition, the epoxy compound (C) is one or more selected from the group consisting of an epoxidized fatty acid ester (C1) and an epoxidized vegetable oil (C2), and a content of the epoxy compound (C) is 0.05% to 3.0% by mass, based on the total amount of the refrigerator oil composition.

11. The mixed composition for a refrigerator according to claim 1, wherein the content of the modified silicone compound (B) is 0.30% to 3.0% by mass based on the total amount of the refrigerator oil composition.

* * * * *